US012735066B2

(12) United States Patent
Ucar et al.

(10) Patent No.: US 12,735,066 B2
(45) Date of Patent: Sep. 15, 2026

(54) SYSTEMS AND METHODS TO IMPROVE KNOWLEDGE CYCLES IN VEHICULAR KNOWLEDGE NETWORKING

(71) Applicant: TOYOTA MOTOR ENGINEERING & MANUFACTURING NORTH AMERICA, INC., Plano, TX (US)

(72) Inventors: Seyhan Ucar, Mountain View, CA (US); Takamasa Higuchi, Mountain View, CA (US); Onur Altintas, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 322 days.

(21) Appl. No.: 18/173,524

(22) Filed: Feb. 23, 2023

(65) Prior Publication Data

US 2024/0286643 A1 Aug. 29, 2024

(51) Int. Cl.

*B60W 60/00* (2020.01)
*B60W 50/14* (2020.01)
*G06N 5/022* (2023.01)

(52) U.S. Cl.

CPC ........ *B60W 60/0015* (2020.02); *B60W 50/14* (2013.01); *G06N 5/022* (2013.01); *B60W 2050/146* (2013.01); *B60W 2555/60* (2020.02)

(58) Field of Classification Search

CPC ............. B60W 60/0015; B60W 50/14; B60W 2050/146; B60W 2555/60; G06N 5/022; G06N 20/00

See application file for complete search history.

(56) References Cited

U.S. PATENT DOCUMENTS 8,451,140 B2 5/2013 Piccinini
9,047,773 B2 6/2015 Chen (Continued)

FOREIGN PATENT DOCUMENTS

CA 3206575 9/2022
CN 203149847 U 8/2013

(Continued)

OTHER PUBLICATIONS

Jin et al., "Advanced Estimation Techniques for Vehicle System Dynamic State: A Survey," Sensors (Basel), 19(19):4289, Oct. 3, 2019 (https://doi.org/10.3390/s19194289).

(Continued)

*Primary Examiner* — Jelani A Smith
*Assistant Examiner* — Alyssa Rorie
(74) *Attorney, Agent, or Firm* — SHEPPARD, MULLIN, RICHTER & HAMPTON LLP; Daniel N. Yannuzzi

(57) ABSTRACT

Systems and methods are provided for vehicular knowledge networking, including an improved knowledge cycle process. Vehicular knowledge networking employs vehicular networking capabilities, such as vehicle-to-vehicle (V2) communication, to create and distribute contextual knowledge of risky zones. The knowledge is received by a vehicle as early guidance, allowing the driver to be preemptively prepared before entering the risky zone and safely maneuver once driving inside of the zone. The improved knowledge cycle process involves creating associated metadata in each stage of the knowledge cycle. The metadata can be analyzed and ultimately used to derive at least one path within the knowledge cycle that is known to have a high performance. Consequently, any degradation of subsequent iterations of the knowledge cycle, are improved by employing only the "beneficial" stages of the knowledge cycle, based on the (Continued)

metadata, in a manner that enhances the usefulness of the knowledge cycle.

20 Claims, 9 Drawing Sheets

(56) References Cited

U.S. PATENT DOCUMENTS 9,495,874 B1 11/2016 Zhu
9,623,765 B2 4/2017 Liu
10,678,259 B1 6/2020 Ferguson
10,942,030 B2 3/2021 Haque
10,970,317 B2 4/2021 Thiel
11,085,774 B2 8/2021 Thiel
11,145,142 B2 10/2021 Chainer
11,282,378 B2 3/2022 Higuchi
11,593,411 B2 2/2023 Bruce
11,645,279 B2 5/2023 Jiang
12,176,630 B2 12/2024 Tran
2005/0132006 A1 6/2005 Horvitz
2008/0077598 A1 3/2008 Wilmering
2009/0114463 A1 5/2009 Devault
2010/0072954 A1 3/2010 Kohn
2011/0153140 A1 6/2011 Datta
2012/0083960 A1 4/2012 Zhu
2012/0109408 A1 5/2012 Siy
2012/0143410 A1 6/2012 Gallagher
2012/0164620 A1* 6/2012 Needham ................. G09B 7/00 434/350
2012/0179518 A1 7/2012 Jaipaul
2013/0024075 A1 1/2013 Zagorski
2013/0151058 A1 6/2013 Zagorski
2013/0166123 A1 6/2013 Donald, III
2013/0238181 A1 9/2013 James
2013/0246020 A1 9/2013 Zeng
2014/0032017 A1 1/2014 Anderson
2014/0074329 A1 3/2014 Yang
2014/0379183 A1 12/2014 Long
2015/0051763 A1 2/2015 Enomoto
2015/0057916 A1 2/2015 Ishii
2015/0291036 A1 10/2015 Ryu
2016/0321585 A1* 11/2016 Saraswat .................. G06N 7/01
2018/0004206 A1* 1/2018 Lagnemma ....... B60W 50/0098
2018/0129205 A1* 5/2018 Choi ...................... G06N 20/00
2019/0078899 A1* 3/2019 Iagnemma ............. G01C 21/34
2019/0079659 A1 3/2019 Adenwala
2019/0132709 A1 5/2019 Graefe
2020/0079382 A1* 3/2020 Boulton ............... G05D 1/0055
2020/0236120 A1* 7/2020 Monteil ................ H04W 12/12
2020/0256681 A1 8/2020 Kim
2021/0034632 A1 2/2021 Meyer
2021/0067369 A1 3/2021 Wiesenberg
2021/0374598 A1* 12/2021 Ben-Ezra ............... G06N 3/082
2022/0026919 A1 1/2022 Micks
2022/0161815 A1* 5/2022 Van Beek ......... B60W 60/0013
2022/0194415 A1 6/2022 Liu
2023/0039738 A1 2/2023 Beaurepaire
2023/0083598 A1 3/2023 Daisuke
2023/0083625 A1 3/2023 Ucar
2023/0154323 A1 5/2023 Yamala
2023/0159025 A1 5/2023 Tummala
2023/0162597 A1 5/2023 Tummala
2023/0204378 A1* 6/2023 Fowe ................... G08G 1/0129 701/450
2023/0267782 A1 8/2023 Ucar
2023/0278585 A1* 9/2023 Hammoud ........ B60W 60/0015 701/26
2023/0386340 A1 11/2023 Takeyasu
2024/0046783 A1 2/2024 Das
2024/0046791 A1 2/2024 Das
2024/0062533 A1 2/2024 Huang
2024/0092382 A1* 3/2024 Sabatini ............ B60W 30/0956
2024/0101128 A1 3/2024 Bradley
2024/0112077 A1* 4/2024 Agrawal .................. G06N 5/02
2024/0119369 A1* 4/2024 Cyras ....................... G06N 3/08
2024/0166240 A1* 5/2024 Lu ......................... B60W 30/09
2024/0220493 A1 7/2024 Gisby
2024/0265021 A1 8/2024 Brown

FOREIGN PATENT DOCUMENTS

CN 105897868 A 8/2016
WO 2013033098 A1 3/2013
WO 2018145786 A1 8/2018
WO 2022242842 11/2022

OTHER PUBLICATIONS

Wu et al., "Hyperparameter Optimization for Machine Learning Models Based on Bayesian Optimization," Journal of Electronic Science and Technology, 17(1):26-40, Mar. 2019 (https://doi.org/10.11989/JEST.1674-862X.80904120).

Ucar et al., "Vehicular Knowledge Networking and Application to Risk Reasoning," 21st International Symposium on Theory, Algorithmic Foundations, and Protocol Design for Mobile Networks and Mobile Computing (Mobihoc 2020) Association for Computing Machinery (ACM), Oct. 2020, pp. 351-356 (https://doi.org/10.1145/3397166.3413467).

Ucar et al., "Vehicular Knowledge Networking and Mobility-Aware Smart Knowledge Placement," 2022 IEEE 19th Annual Consumer Communications & Networking Conference (CCNC), Jan. 2022, 6 pages (https://doi.org/10.1109/CCNC49033.2022.9700568).

Ucar et al., "Driver Support in Confusion Zones," 6 pages.

Madrid et al., "Matrix Profile XX: Finding and Visualizing Time Series Motifs of All Lengths using the Matrix Profile," 2019 IEEE International Conference on Big Knowledge (ICBK), Nov. 2019, pp. 175-182 (https://doi.org/10.1109/ICBK.2019.00031).

Mercer et al., "Introducing the Contrast Profile: A Novel Time Series Primitive that Allows Real World Classification," Data Mining and Knowledge Discovery (DMKD 2022), 36:877-915, Mar. 17, 2022 (https://doi.org/10.1007/s10618-022-00824-5).

Ucar et al., "Risk Avoidance by Vehicular Knowledge Networking," 2022 IEEE 95th Vehicular Technology Conference (VTC2022-Spring), Jun. 2022, 5 pages (https://doi.org/10.1109/VTC2022-Spring54318.2022.9861035).

Vatanparvar et al., "Extended Range Electric Vehicle With Driving Behavior Estimation in Energy Management," IEEE Transactions on Smart Grid, 10(3):2959-2968, May 2019 (https://doi.org/10.1109/TSG.2018.2815689).

Deveaux et al., "Role of Context in Determining Transfer of Risk Knowledge in Roundabouts," 2022 Transportation Research Part C: Emerging Technologies, Dec. 10, 2021, 40 pages (https://www.eurecom.fr/publication/6759).

Betz, "Development of an Explicit Context Data Model for Dynamic Risk Assessment of Autonomous Vehicles," Master Thesis, Technical University of Kaiserslautern, Department of Computer Science, Nov. 29, 2019, 87 pages (http://dx.doi.org/10.13140/RG.2.2.17838.05446).

Kulkarni et al., "Model and Machine Learning based Caching and Routing Algorithms for Cache-enabled Networks," Apr. 14, 2020, 7 pages (https://doi.org/10.48550/arXiv.2004.06787).

Deveaux et al., "A Knowledge Networking Approach for AI-driven Roundabout Risk Assessment," 17th Wireless On-Demand Network Systems and Services Conference (WONS), Mar. 30, 2022, 8 pages (https://doi.org/10.23919/WONS54113.2022.9764530).

* cited by examiner

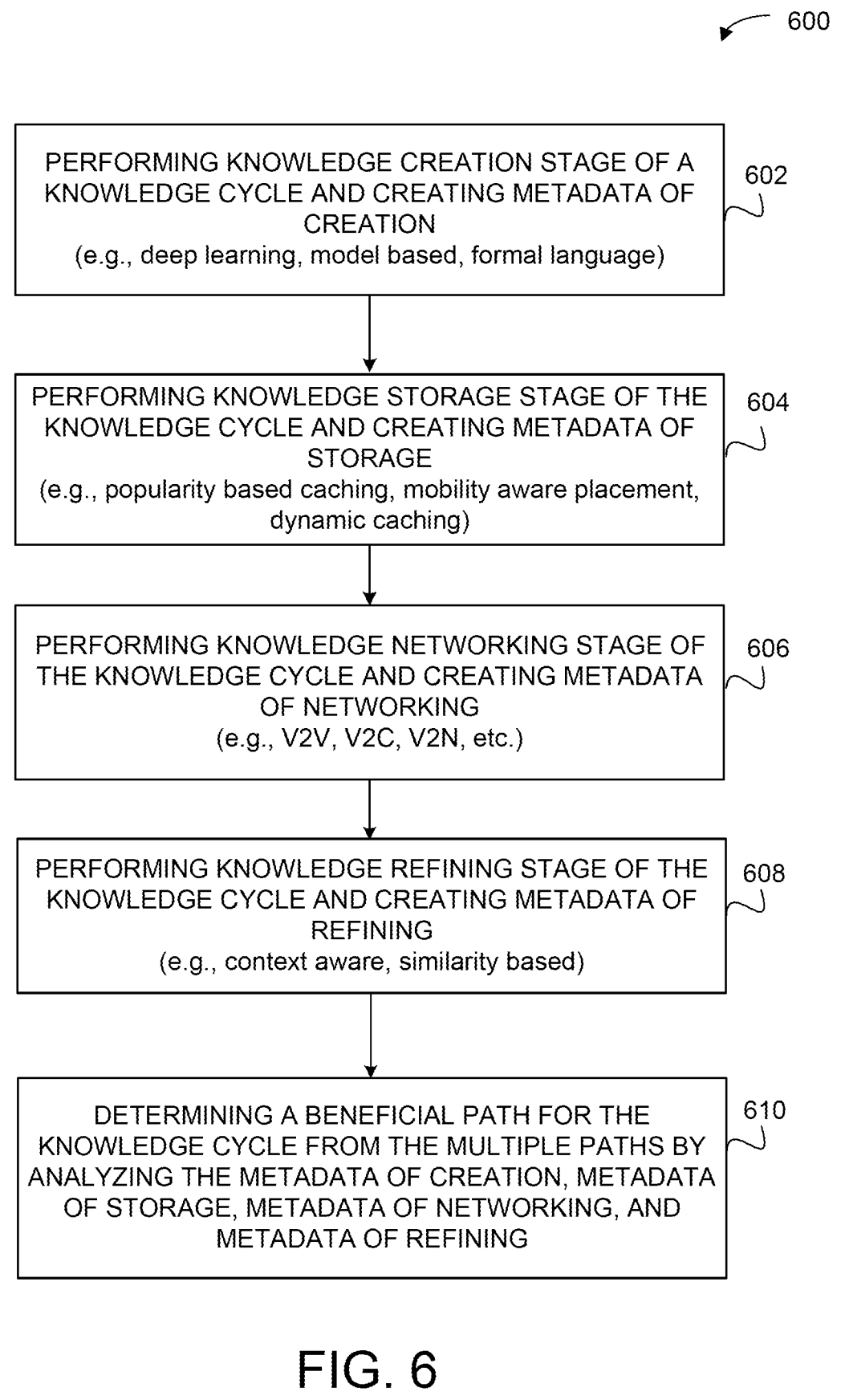

600

PERFORMING KNOWLEDGE CREATION STAGE OF A KNOWLEDGE CYCLE AND CREATING METADATA OF CREATION (e.g., deep learning, model based, formal language) — 602

PERFORMING KNOWLEDGE STORAGE STAGE OF THE KNOWLEDGE CYCLE AND CREATING METADATA OF STORAGE (e.g., popularity based caching, mobility aware placement, dynamic caching) — 604

PERFORMING KNOWLEDGE NETWORKING STAGE OF THE KNOWLEDGE CYCLE AND CREATING METADATA OF NETWORKING (e.g., V2V, V2C, V2N, etc.) — 606

PERFORMING KNOWLEDGE REFINING STAGE OF THE KNOWLEDGE CYCLE AND CREATING METADATA OF REFINING (e.g., context aware, similarity based) — 608

DETERMINING A BENEFICIAL PATH FOR THE KNOWLEDGE CYCLE FROM THE MULTIPLE PATHS BY ANALYZING THE METADATA OF CREATION, METADATA OF STORAGE, METADATA OF NETWORKING, AND METADATA OF REFINING — 610

FIG. 6

SYSTEMS AND METHODS TO IMPROVE KNOWLEDGE CYCLES IN VEHICULAR KNOWLEDGE NETWORKING

REFERENCE TO RELATED APPLICATIONS

The present application is related to U.S. patent application Ser. No. 16/365,092, filed Mar. 26, 2019, and titled "VEHICULAR KNOWLEDGE DISTRIBUTION SYSTEM" and U.S. patent application Ser. No. 16/735,612, filed Jan. 6, 2020, and titled "VEHICULAR MICRO CLOUD HUBS," which are incorporated herein by reference in entirety.

TECHNICAL FIELD

The present disclosure relates generally to systems and methods for vehicular knowledge networking. Specifically, some implementations relate to improving a knowledge cycle used in vehicle knowledge networking by creating and analyzing metadata.

DESCRIPTION OF RELATED ART

Technological advancements in the realm of communication networking have led to an emergence of "vehicular networking" (or connected vehicles), where direct connections between vehicles and other points (e.g., infrastructure, network, cloud, etc.) are enabled. With the various types of vehicle communication capabilities that have become available, vehicular networking may be further leveraged to support the concept of sharing "knowledge" in a manner that improves the operation of vehicles.

Occasionally, driving scenarios exist where driver's do not know how to behave. For example, a driver may not understand how to safely perform a merge maneuver with a plurality of vehicles all traveling uniformly in the same lane. A driver may also not know how to proceed through an atypical intersection. Not knowing how to behave in these scenarios can result in accidents. In instances such as these, equipping vehicles with the capability to analyze, store, and share knowledge (e.g., knowledge of how to maneuver safely in certain situations) is promising and can improve vehicle safety and overall performance.

BRIEF SUMMARY OF THE DISCLOSURE

In accordance with some embodiments, a vehicle is implemented including a processor device executing a knowledge cycle, wherein executing the knowledge cycle comprises creating knowledge associated with a driving environment and creating metadata relating to the knowledge cycle. The vehicle also including a controller device receiving knowledge and performing one or more safety operations approaching the driving environment, wherein the knowledge is associated with the driving environment.

In accordance with some embodiments, a system is implemented including at least one memory storing machine-executable instructions; and at least one processor configured to access the at least one memory and execute the machine-executable instructions to execute a knowledge cycle associated with knowledge, wherein executing the knowledge cycle comprises creating knowledge related to a driving environment and the knowledge cycle comprises a plurality of stages. Further, executing the machine-executable instructions to create metadata associated with the knowledge cycle, wherein metadata is created for each of the plurality of stages of the knowledge cycle, and determine at least one beneficial path for the knowledge cycle by analyzing the metadata associated with the knowledge cycle, wherein the beneficial path comprises a composite of one or more stages from the plurality of stages that are determined to be beneficial. Also, executing the machine-executable instructions to perform one or more safety operations approaching the driving environment based on the knowledge related to the driving environment.

In accordance with some embodiments, a method is implemented including executing a knowledge cycle associated with knowledge, wherein executing the knowledge cycle comprises creating knowledge related to a driving environment and the knowledge cycle comprises a plurality of stages. The method further involves creating metadata associated with the knowledge cycle, wherein metadata is created for each of the plurality of stages of the knowledge cycle, and analyzing the metadata associated with the knowledge cycle. Based on the analysis of the metadata associated with the knowledge cycle, the method further determines at least one beneficial path for the knowledge cycle based, wherein the beneficial path comprises a composite of one or more stages from the plurality of stages that are determined to be beneficial. Also, the method includes performing one or more safety operations approaching the driving environment based on the knowledge related to the driving environment.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 6 depicts an example of a method of implementing an improved knowledge networking cycle, according to one embodiment.

Figure 1:
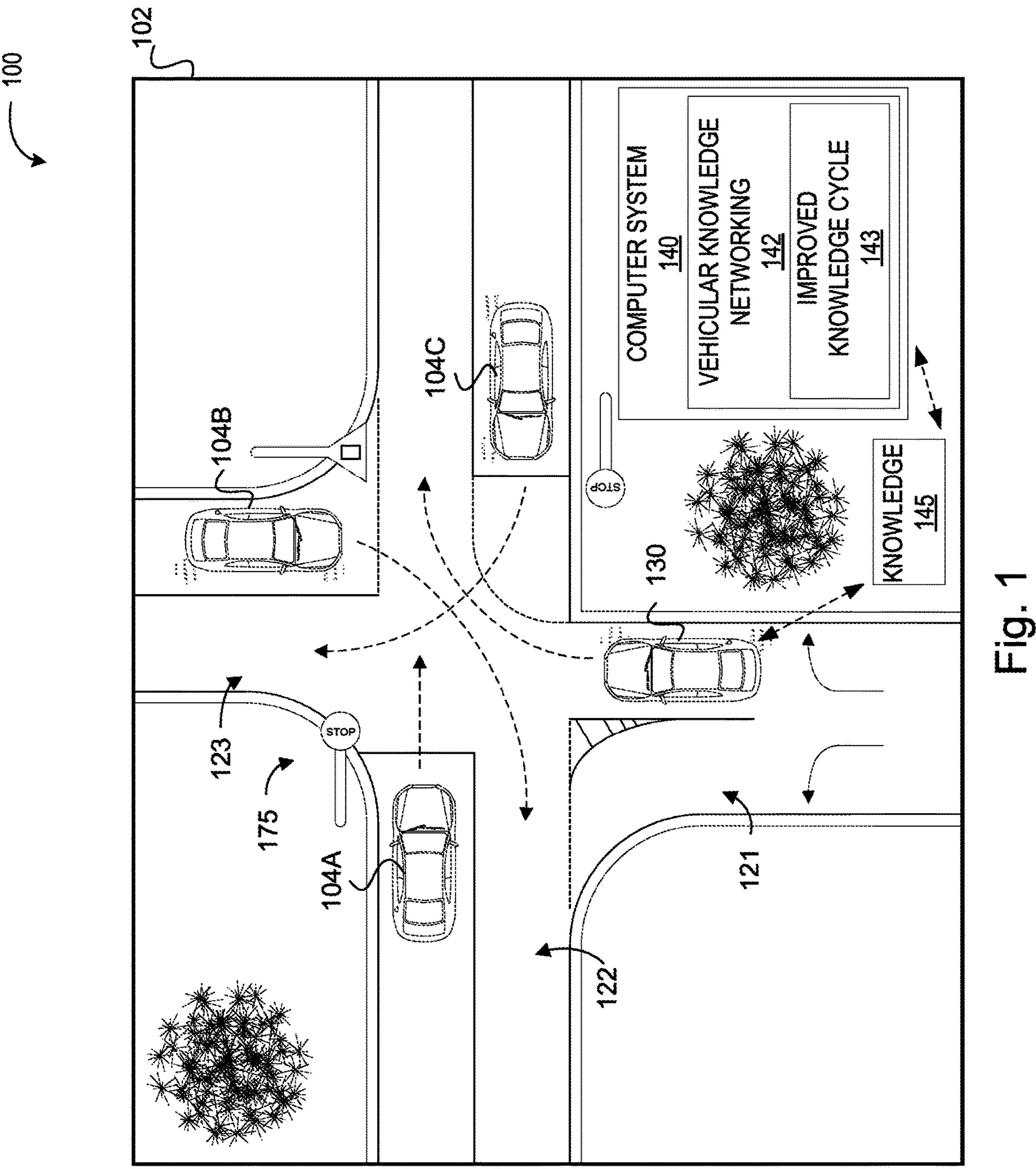
FIG. 1 depicts an example illustration of a vehicle environment implementing a vehicular knowledge networking system including an improved knowledge cycle system, according to one embodiment.

The figures are not exhaustive and do not limit the present disclosure to the precise form disclosed.

DETAILED DESCRIPTION

On occasion, in certain complicated driving environments that may be confusing to the driver, a driver may not know how to behave or may behave in a manner that is risky and increases the potential of a dangerous accident (or collision). A driver's behavior can refer generally to actions, reactions, or operations, that may be performed or undertaken by a driver while operating a vehicle. At certain times while operating a vehicle, traffic conditions, environmental conditions, or the vehicle's condition and/or operating state may cause or result in a driver not knowing or understanding what action, reaction, or driving decision, should be performed upon encountering such a condition. For example, when a driver enters into a roundabout, or when a driver is attempting to merge into a lane with a platoon of vehicles (i.e., a series of vehicles traveling at roughly the same speed in the same lane at roughly the same intervals), the driver may not know the right-of-way rules associated with the roadway or the traffic pattern. Another such example is when a driver misses their intended exit, and as a result may be confused as to whether they should refrain from performing any risky driving maneuvers (e.g., keep going and eventually loop back around) which then causes them to have to reroute. However, in this scenario, some drivers decide to engage in risky behavior in attempt to reach the correct exit, such as perform abrupt lane changes or slam on the brakes on the shoulder of the road, hoping they can still make the turn. In order to address the aforementioned and similar issues, equipping vehicles with capabilities to infer and share guidance in instances when many drivers become confused in these complicated driving environments (referred to herein as risky zone) may mitigate collision risk in these zones, thereby preventing vehicular damage, bodily injury and/or fatality, and significantly improving overall driver safety.

Current methods to improve vehicle safety typically include providing feedback as the driver engages in an unsafe driving maneuver. For example, a current driver/vehicle safety system may produce an audible notification to warn the driver that they are attempting to move into a lane that is already occupied by another vehicle. Particularly, a current driver/vehicle safety system may beep if a driver attempts to change lanes and does not see another vehicle in his/her blind spot, in order to notify the driver of the vehicle in his/her blind spot. Although such safety alerts can be helpful, current driver/vehicle safety systems are often restricted to functioning while the driver is in the middle of a dangerous maneuver (e.g., providing little to no reaction time) which increases the risk of a catastrophic collision. In other words, these conventional driver/vehicle safety systems do not proactively provide guidance and/or knowledge that the driver can utilize while they are still approaching a risky zone. Although reactive feedback methods offer some level of prevention, a predictive system and method could prevent the drivers from engaging in the unsafe driving maneuver altogether.

In contrast to the aforementioned conventional systems, the disclosed system distinctly leverages communicating "knowledge" between vehicles (also referred to herein a vehicular knowledge networking) in a manner that proactively warns drivers in risky zones (e.g., risky and/or confusing driving environments). For instance, the disclosed system employs vehicular networking capabilities, such as vehicle-to-vehicle (V2) communication, to create and distribute contextual knowledge of risky zones. Further, this knowledge can be received by a vehicle (e.g., a driver approaching said risky zone) as early guidance, allowing the driver to be preemptively prepared before entering the risky zone and then safely maneuver once driving inside of the zone. Alternatively, with using conventional driver/vehicle safety systems, the driver would not be warned until they are already in the risky zone, confused, and performing risky maneuver that could cause a dangerous crash. Because it is so crucial to stay alert and aware of complicated driving environments, like risky zones, while driving, the disclosed embodiments utilize vehicular knowledge networking to implement a more effective safety system that equips vehicles to provide a priori guidance (e.g., prior to entering the risky zone) in a manner that thwarts driver confusion and enables the driver to be ready for maneuvering safely before reaching the risky zone. Restated, the vehicular knowledge network system and methods proposed herein, leverage knowledge to assist drivers in various driver/vehicle safety applications, such as risk reasoning and vehicular maneuvering in a manner that is preemptive and provides improvements over the reactionary (i.e., systems based on the driver engaging, or attempting to engage in a driving maneuver) limitations of conventional driver/vehicle safety systems.

Furthermore, the disclosed embodiments include an improved knowledge cycle process that involves creating associated metadata in each stage of the knowledge cycle. The metadata associated with the knowledge cycle can be analyzed and ultimately used to derive at least one path (e.g., a particular arrangement of stages of the knowledge cycle) within the knowledge cycle that is known to have a high performance (also referred to herein as "beneficial" stages of a knowledge cycle). Consequently, if there is any degradation of subsequent iterations of the knowledge cycle, the cycle can be improved by employing only the "beneficial" stages of the knowledge cycle (based on the metadata) in a manner that enhances the usefulness of the knowledge cycle (e.g., performance if beneficial/delivered to a high number of vehicles) and the corresponding knowledge. According to the embodiments, as will be described in greater detail throughout the disclosure, a knowledge cycle includes several interrelated stages that involve dissemination and utilization of knowledge, including: knowledge creation; knowledge storing; knowledge networking; and knowledge refining (e.g., knowledge transfer and knowledge composition). As described herein, the aforementioned knowledge cycle, the entities involved in the communication (e.g., vehicles, infrastructure, etc.), the vehicular network (e.g., vehicle-to-vehicle networking, vehicle-to-cloud networking, etc.), data (e.g., knowledge), and functionality related to creating and using knowledge can be referred to collectively as "vehicular knowledge networking."

An important aspect of the disclosed knowledge cycle involves creating metadata that corresponds to each of the aforementioned stages. For example, the disclosed process can utilize: metadata of creation which is descriptive data that is particularly relevant to the knowledge creation stage; metadata of storage which is descriptive data that is particularly relevant to the knowledge storing stage; metadata of networking which is descriptive data that is particularly relevant to the knowledge networking; and metadata of refining (e.g., metadata of transfer and metadata of composition) which is descriptive data that is particularly relevant to the knowledge refining stage. This metadata is directly associated with the knowledge cycle and provides context to each stage, thusly the metadata can be analyzed such that a repetitive pattern is inferred. The inference is indicative of at least one path (or a particular arrangement of stages) in the knowledge cycle that is beneficial. A beneficial path can be described as a composite of specific stages of a knowledge cycle that are most utilized. For instance, if the majority of vehicles in a vehicular network frequently use knowledge that has been created from a model-based approach (e.g., "model-based" is metadata describing the type of knowledge creation used in that stage of the knowledge cycle), then it can be inferred that knowledge created using the model-based approach has wide-spread benefits (e.g., accurate, highly applicable, high performance, context rich, etc.). Additionally, by analyzing this metadata, it can be determined that the specific "model-based knowledge creation stage" would be a part of the beneficial path for that knowledge cycle. In an implementation, the vehicular knowledge network system can employ the beneficial path (determined by analyzing the metadata) when performance of the knowledge cycle has been degraded, in order to ultimately improve the cycle's performance.

Figure 2:
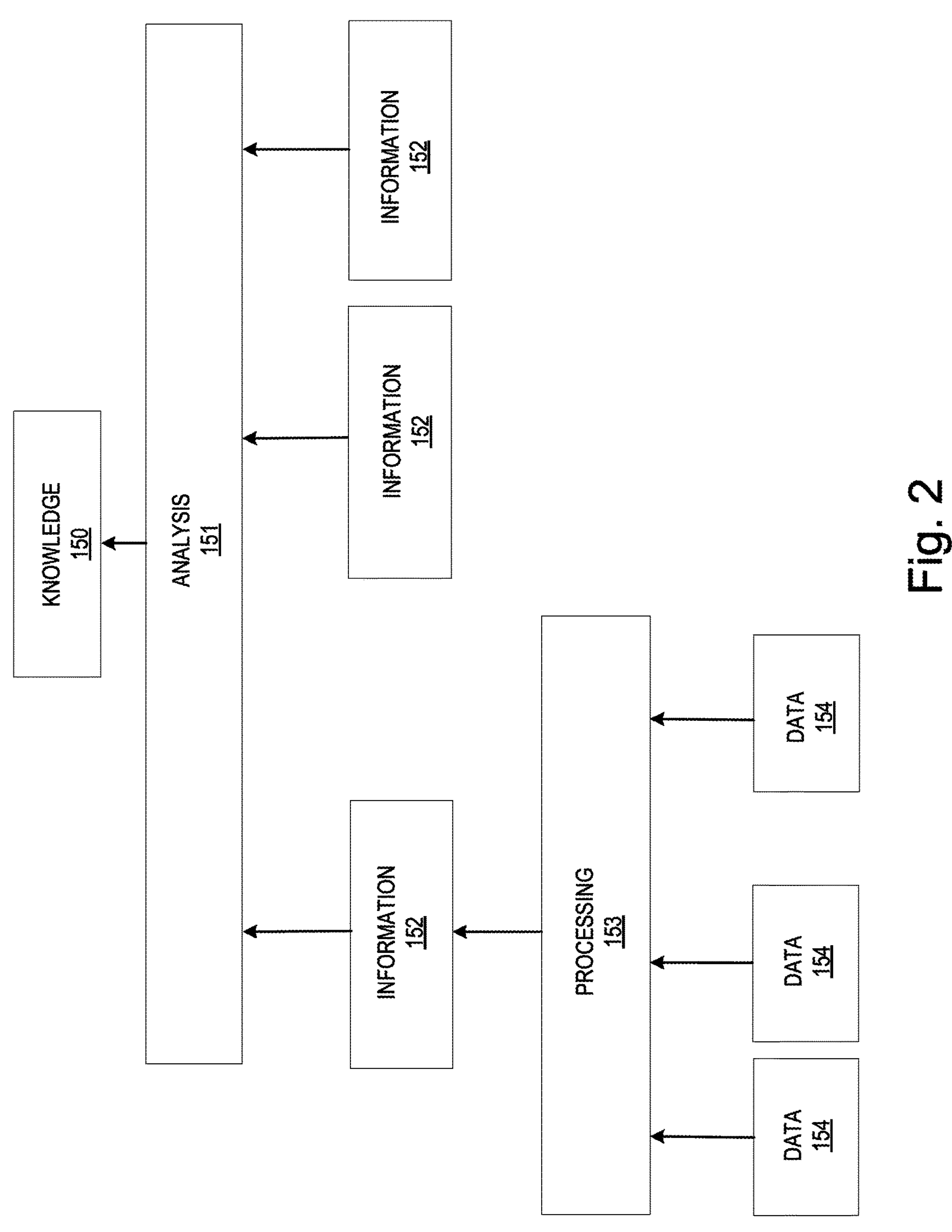
FIG. 2 depicts a conceptual diagram for a hierarchal architecture for data, information, and knowledge used in a vehicular knowledge network, for example the vehicular knowledge network of FIG. 1, according to one embodiment.

A referred to herein, "knowledge" is conceptually a state of understanding that is obtained through experience and analysis of collected information, such as raw data. A critical function of the vehicular knowledge network, as disclosed herein, is the capability to transform data, such as raw data collected from vehicle sensors, into searchable knowledge, and subsequently to create and distribute this knowledge with various life cycles and relevance. Referring now to FIG. 2, a conceptual diagram depicts a hierarchy among data 154 information 152, and knowledge 150. As seen in FIG. 2, the hierarchy can include data 154 which is a piece of a recorded experience, such as vehicular speed mph, time t, position p that may be collected as raw data from the vehicle's sensors. In addition, the hierarchy can include information 152 which is pieces of data 154 that have been subjected to processing 153. Thus, data 154 can be contextual "meaningful." For instance, continuing with the example, the aforementioned raw data 154 from the vehicle can be processed to ascertain meaningful information 152 about the vehicle, such as "the vehicle was moving at a speed mph at time t and at position p." Further, FIG. 2 illustrates that information 152 can be subjected to analysis 151 in order to derive knowledge 150. It is knowledge 150 that is the most contextual-rich in comparison to data 154 and information 152, which is as illustrated by knowledge 150 being at the top of the hierarchy. As alluded to above, knowledge 150 can be considered as a fact, a belief extracted by analyzing patterns in information 152. For instance, knowledge 150 can be created through analysis 151 of multiple instances of information 152 and it is a fact or a belief that represents the hidden relationship among the information 152. Again, continuing with the example, knowledge 150 can be an inferred context surrounding the vehicle, where knowledge 150 identifies that sequential conflicts happen the most in an area X (related to vehicle's location P), thus X is a risky zone. The creation of knowledge 150 may require computationally hungry algorithms and a set of information 152 and/or data 154 that are potentially from multiple sources (e.g., vehicles). In operation, the vehicular knowledge network depicted in FIG. 2 organizes vehicle sensor measurements into data 154, information 152, and knowledge 150.

FIG. 1 is a schematic diagram of an example environment 102 in which a vehicular knowledge network system 100 can be implemented. The example operating environment 102 includes an ego vehicle 130, and one or more vehicles 104A-104C at a complicated driving environment shown as an atypical four-way intersection. The atypical intersection is an any intersection that includes roadway features that may cause driver confusion, and thus may be considered as a risky zone. The roadway features can be any type of traffic signals, roadway patterns, roadway hazards etc. that may cause a driver to become confused as to how to proceed through the intersection. For example, in one embodiment, the atypical intersection can include the intersection of FIG. 1. It should be understood that the operational environment in FIG. 1 is described for purposes of illustration and is not intended to be limiting, thus the described vehicular knowledge networking and improved knowledge cycle capabilities can implement enhanced driver/vehicle safety functions that are similarly applicable to various other types of potentially risky, confusing, or dangerous driving environments that are not shown (e.g., roundabouts, exits, and the like). Thus, in another example, the atypical intersection can include an intersection with no-electricity (a traffic signal outage). The atypical four-way intersection of FIG. 1 includes a first roadway 121, a second roadway 122 and a third roadway 123. The first roadway 121 and the third roadway 123 intersect the second roadway 122 at different points, creating an offset intersection 175.

The vehicular knowledge networking and improved knowledge cycle capabilities, as disclosed herein, may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. In the example of FIG. 1, the vehicle 130 in which embodiments of the disclosed technology may be implemented is illustrated. Although the example described with reference to FIG. 1 is a type of semi-autonomous vehicle, the systems and methods described herein can be implemented in other types of vehicles including autonomous vehicles, vehicles with automatic controls (e.g., dynamic cruise control), or other vehicles. Also, the example vehicle 130 described with reference to FIG. 1 is a type of hybrid electric vehicle (HEV). However, this is not intended to be limiting, and the disclosed embodiments can be implemented in other types of vehicles including gasoline- or diesel-powered vehicles, fuel-cell vehicles, electric vehicles, or other vehicles.

According to an embodiment, vehicle 130 can be a semi-autonomous vehicle, such as a vehicle having assisted driving capabilities, which also implements the vehicular knowledge networking and improved knowledge cycle functions, as disclosed herein. "Semi-autonomous operational mode" means that a portion of the navigation and/or maneuvering of the vehicle 130 along a travel route is performed by one or more computing systems, and a portion of the navigation and/or maneuvering of the vehicle 130 along a travel route is performed by a human driver. One example of a semi-autonomous operational mode is when an adaptive cruise control system is activated. In such case, the speed of a vehicle 130 can be automatically adjusted to maintain a safe distance from a vehicle ahead based on data received from on-board sensors, but the vehicle 130 is otherwise operated manually by a human driver. Upon receiving a driver input to alter the speed of the vehicle (e.g., by depressing the brake pedal to reduce the speed of the vehicle), the speed of the vehicle is reduced. Thus, with vehicle 130 operating as a semi-autonomous vehicle, a response can be partially automated. In an example, the controller communicates a newly generated (or updated) control to the vehicle 130 operating as a semi-autonomous vehicle. The vehicle 130 can automatically perform some of the desired adjustments (e.g., accelerating) with no human driver interaction. Alternatively, the vehicle 130 may notify a driver that driver input is necessary or desired in response to a new (or updated) safety control.

Alternatively, or in addition to the above-described modes, vehicle 130 can have one or more autonomous operational modes. As used herein, “autonomous vehicle” means a vehicle that is configured to operate in an autonomous operational mode. “Autonomous operational mode” means that one or more computing systems of the vehicle 130 are used to navigate and/or maneuver the vehicle along a travel route with a limited level of input from a human driver which varies with the operational mode. As such, vehicle 130 can have a plurality of autonomous operational modes, where each mode correspondingly responds to a controller, with a varied level of automated response. In some embodiments, the vehicle 130 can have an unmonitored autonomous operational mode. “Unmonitored autonomous operational mode” means that one or more computing systems are used to maneuver the vehicle along a travel route fully autonomously, requiring no input or supervision required from a human driver. Thus, as an unmonitored autonomous vehicle 130, responses can be highly, or fully, automated. For example, a controller can be configured to communicate controls so as to operate the vehicle 130 autonomously and safely. After the controller communicates a control to the vehicle 130 operating as an autonomous vehicle, the vehicle 130 can automatically perform the desired adjustments (e.g., accelerating or decelerating) with no human driver interaction. Accordingly, vehicle 130 can operate any of its components autonomously, such as an engine.

The plurality of vehicles depicted in the example environment 102 of FIG. 1 includes the ego vehicle 130 and vehicles 104A-104C. Vehicles 104A-104C may each provide similar functionality to the ego vehicle 130. Ego vehicle 130 may be any type of vehicle. For example, ego vehicle 130 may be a car; a truck; a sports utility vehicle; a bus; a semi-truck; a drone or any other roadway-based conveyance. Also, FIG. 1 depicts the ego vehicle 130 and vehicles 104A-104C as a network of connected vehicles. As used herein, “connected vehicle” refers to a vehicle that is actively connected to edge devices, other vehicles, and/or a cloud server via a network through V2X communication comprising V2I, V2C, C2V and/or V2V communications. For example, the ego vehicle 130 and the vehicles 104A-104C are connected vehicles that include communication circuitry (and other hardware/software providing such capabilities installed thereon) which is capable of wireless communication (e.g., V2X, V2I, V2V, etc.) that enables active connections to other vehicles and/or communication devices. As an example, vehicles 130, 104A-104C communicate with each other using vehicle-to-vehicle (V2V) and communicate to the remote cloud and/or the computer system 140 (or edge server) through the and vehicle-to-cloud (V2C) communication. Accordingly, the ego vehicle 130, vehicles 104A-104C, and the computer system 140 being within the same vicinity can be considered a hub of the vehicular knowledge network system 100. Generally, vehicular knowledge network system 100 supports several key functions, including, but not limited to: performing improved knowledge cycle techniques (e.g., including creating knowledge), as disclosed herein; communicating requests to knowledge nodes (e.g., vehicles 130, 104A-104C) for one or more instances of knowledge; forwarding the requests toward appropriate knowledge nodes, which are expected to have the requested knowledge (e.g., nodes closer to the geographical region); communicating responses to the requests from other knowledge nodes if it has the requested knowledge in its own knowledge base or from edge server; and communicating the requested knowledge to communication points and knowledge nodes within the system 100. Thus, by implementing aspects of vehicular knowledge networking, the ego vehicle 130 can have its own knowledge base, which can be shared and/or communicated with a remote cloud and/or computer system 140 (e.g., edge server) and other vehicles 104A-104C.

According to the embodiments, the vehicle 130 is distinctly configured to implement the vehicular knowledge networking and improved knowledge cycle capabilities, as disclosed herein. That is, the vehicle 130 is equipped to convert data generated and exchanged among vehicles into knowledge 145, where the knowledge 145 provides insight regarding traffic events, driving environment, driving conditions, congestion, and the like. Furthermore, the vehicle 130 can utilize accessed knowledge 145 in order to optimize various vehicular safety applications. Particularly, in the example of FIG. 1, the vehicle 130 can leverage vehicular knowledge networking in order to perform a risk reasoning application. Thus, by implementing risk reasoning, vehicle 130 can quantify the risk levels in their environment and identify the knowledge of risky zones (e.g., risky road users and risky zone locations), and leverage the knowledge of the risky zone to generate guidance for the driver to mitigate risk and improve traffic flow. Risk reasoning can involve analyzing vehicular maneuver conflicts to extract the knowledge of risky road users and risky locations, in manner that improves traffic planning and safe driving. As alluded to above, an example of a risky zone is illustrated in FIG. 1 as an atypical intersection.

In an embodiment, all of the entities in the vehicular knowledge network system 100, namely the ego vehicle 130, vehicles 104A-104C, and computer system 140, are configured to implement various aspects of vehicular knowledge networking, including the disclosed improved knowledge cycle. In one or more embodiments of the present disclosure, functions supporting vehicular knowledge networking and the improved knowledge cycle can be performed as part of a training process, which may be carried out using a computer system 140. In the example of FIG. 1, the computer system 140 is depicted as a server, namely an edge server, within the vehicular knowledge network 100. As seen in FIG. 1, the computer system 140 (also referred to herein as edge server) is configured to include a vehicular knowledge networking system 142 and an improved knowledge cycle system 143. For example, the computer system 140 might include one or more processors, controllers, control modules, or other processing devices, where the vehicular knowledge network system 142 and the improved knowledge cycle system 143 are implemented as hardware processor(s). Alternatively, the vehicular knowledge networking system 142 and the improved knowledge cycle system 143 may be implemented as software on the computer system 140, such as instructions, machine-readable code, or computer program components.

The computer system 140 may be an edge server that resides as a back-end system relative to vehicles 130, and 104A-104C. By way of example, knowledge 145 can be created on the computer system 140, operating as an edge server, via the received data and/or information that is received from connected vehicles. Subsequently, knowledge 145 can be distributed throughout the vehicular knowledge network system 100. FIG. 1 depicts knowledge 145, being created at computer system 140, being distributed through the V2C communications to ego vehicle 130. For instance, once optimization of the knowledge cycle has converged on the computer system 140, knowledge 145 can then be uploaded to a computer system of the ego vehicle 130, for example in the form of trained machine learning models, and used for autonomous, semi-autonomous, assisted, or other driving systems. It should also be appreciated upon studying the present disclosure that in one or more embodiments the functions or elements of computer system 140 (including the vehicular knowledge networking unit 142 and the knowledge cycle unit 143) may reside on board a vehicle, such as ego vehicle 130. For example, all or part of computer system 140 may reside within ego vehicle 130 and their functionalities may be performed thereby.

As previously described, entities of the vehicular knowledge network system 100 are configured to execute the disclosed improved knowledge cycle (e.g., knowledge cycle with optimized performance). The knowledge cycle can be described as the overall steps for creating and/or distributing knowledge in vehicular knowledge networking, such as vehicular knowledge network system 100. FIG. 1 depicts the computer system 140 as an entity implementing aspects of the improved knowledge cycle, having improved knowledge cycle system 143 which is distinctly configured to execute the improved knowledge cycle techniques disclosed herein. Details of the improved knowledge cycle are described in reference to FIG. 6-FIG. 8. Thus, for purposes of brevity, these details are not described here in the discussion of FIG. 1. In an embodiment, the improved knowledge cycle system 143 is configured to execute the improved knowledge cycle methods depicted in FIG. 6 and FIG. 7. Generally, the improved knowledge cycle implemented by the improved knowledge cycle system 143 includes several steps, including but not limited to: knowledge creation; knowledge storage, where the created knowledge is stored and placed intelligently such that a high number of vehicles can access and consume it; knowledge networking, which involves developing the network topology and query/distribution of knowledge; knowledge transfer and knowledge composition, which involves refinement of the knowledge such as merge/accumulation of knowledge.

Additionally, the improved knowledge cycle system 143 is configured to perform distinct improved knowledge cycle functions of the disclosed embodiments, including: creating metadata about each step in the knowledge cycle; analyzing this metadata over time (e.g., several iterations of knowledge cycles); and inferring at least one path (or a particular arrangement of stages) in the knowledge cycle that is beneficial. In other words, metadata generated by the improved knowledge cycle system 143 provides insight into identifying a "beneficial" path for the knowledge cycle, namely which stages are key contributors (e.g., most utilized) to the most successful and/or high-performance knowledge cycles. A beneficial path can be described as a composite of specific stages from beneficial knowledge cycles that are most utilized. In operation of a vehicular knowledge network, performance of the knowledge cycle may become degraded, which may lead to frequently performing knowledge cycles that are not beneficial, and ultimately yielding knowledge that is not beneficial. A design goal of vehicular knowledge networking is to maximize the benefits of its knowledge (e.g., knowledge is useful/utilized by a large number of entities), thus having insight into the most beneficial paths for knowledge cycles can be used to dynamically improve the performance of the cycle and yield knowledge that is optimally beneficial. By creating and analyzing metadata, the improved knowledge cycle system 143 can also execute degradation mitigation aspects of the improved knowledge cycle (e.g., adjusting the knowledge cycle using the determined beneficial path to optimize performance). Particularly, when performance of the knowledge cycle has degraded, the improved knowledge cycle system 143 can modify the knowledge cycle to execute only the beneficial path, thereby mitigating the degradation and improving the knowledge cycle to make it more beneficial for more entities. Therefore, entities in the vehicular knowledge network 100, such as ego vehicle 130, may leverage potentially "improved" knowledge 145 resulting from an improved knowledge cycle (e.g., optimized by the disclosed improved knowledge cycle techniques). Furthermore, the "improved" knowledge 145 from an improved knowledge cycle may provide better insight regarding the risky zone (shown as atypical intersection) and effectuate improved guidance through the risky zone thereby improving overall vehicle/driver safety.

FIG. 1 depicts knowledge 145, which is communicated throughout the vehicular knowledge network system 100, and can be created by a single vehicle and/or cluster of vehicles (e.g., vehicular micro cloud) cooperatively. Thus, the ego vehicle 130 and surrounding vehicles 104A-104C can be referred to as knowledge nodes within the vehicular knowledge network system 100. Alternatively, or in addition, knowledge 145 can be created at the edge (e.g., by a computer system 140) the through collaboratively collected data from vehicles within the range of the network, such as vehicles 130, 104A-104C. The knowledge creation can include all the vehicles inside of a cluster, shown in FIG. 1 as vehicles 130, 104A-104C, but might potentially also be extended to surrounding vehicles or a specific region. According to the embodiments, the created knowledge 145 is further associated with metadata.

For example, vehicles 130, 104A-104C can be equipped with on-vehicle sensors that collect real-time data while driving, where the data (e.g., speed, temperature, road conditions, etc.) is pertinent to driving and/or maneuvering operations. This data, also referred to herein as raw sensor data, can then be communicated, stored, analyzed in accordance with various vehicular networking technologies, and analyzed in order to transform the data into knowledge 145. For instance, the speed at which different vehicles move along a road in a certain location can be collected, by the respective vehicles, over time. The raw sensor data can be processed in accordance with the disclosed vehicular knowledge networking capabilities to provide meaningful information in the form of knowledge 145. Multiple pieces of raw sensor data, possibly from different vehicles 130, 104A-104C infers the inner relationship or repeating patterns that may be found in data, thereby extracting insight on this data that can as knowledge 145. For example, the edge server, namely computer system 140, and the ego vehicle 130 can perform the improved knowledge cycle to create knowledge 145. In the example of FIG. 1, knowledge 145 can be related to the atypical intersection, or risky zone, for the risk reasoning application. For instance, knowledge 145 can provide insight on the type of maneuvering conflicts (e.g., crossing, merging, sequential and diverging) that are often experienced by vehicles in this atypical intersection.

As referred to herein, a maneuvering conflict is defined as an observable event that may end in an accident unless a safety maneuver is performed (e.g., slows down, changes lanes, or decelerates/accelerates to avoid collision). Thus, the vehicular knowledge networking system 100 forms a knowledge network among entities (e.g., vehicles 130, 104A-104C), where vehicles 130, 104A-104C can deduce and share knowledge 145 for enhanced driver/vehicle safety applications (e.g., risk reasoning) instead of large volumes of raw sensor data and information (which reduces the cost and volume of communication).

In operation, when the driver of the ego vehicle 130 approaches the atypical intersection comprising an offset intersection 175, he or she may not know/remember the standard operating procedures of that intersection (i.e., he or she may not know the rules of the road). Moreover, given the presence of one or more vehicles 104A-104C, the driver may not know/remember which vehicle has the right of way. An atypical intersection can be any intersection that includes roadway features not found in a typical roadway. For purposes of this disclosure "atypical" is defined as an intersection including roadway features that may cause confusion to a driver. For example, as seen in FIG. 1 the roadway includes an offset intersection comprising multiple roadways. The roadway features comprising turn lanes, stop signs, yield signs etc., can be confusing to a driver. Accordingly, the driver of the ego vehicle 130 may want to quantify the risk levels associated with the atypical intersection, and thus sends a request to the edge server (or cloud), specifying a set of knowledge tags (i.e., identification and/or location tags), to receive the knowledge 145 regarding the driving environment. As alluded to above, the knowledge 145 in this example can include risky road users (e.g., abnormal drivers) and identified risky zones. Then, the knowledge 145 can be shared with the ego vehicle 130 through V2C communications. As previously described, the ego vehicle 130 can then execute safety maneuvers as a result of the knowledge 145 it has received regarding the atypical intersection that it is approaching. As an example, if the knowledge 145 indicates that atypical intersection is a risky zone, and/or the nearby vehicles 104A-104C are identified as risky users, certain safety maneuvers may be autonomously performed, such as slowing down, because of the risk of the driving environment. The vehicular knowledge networking system 100 and improved knowledge cycle techniques realize enhanced safety applications, such as risk reasoning, based on knowledge of a current traffic environment which improves the vehicle/driver safety by making preventive and proactive decisions to minimize the threat for all vehicles that are and/or will be affected by the riskiness. Furthermore, by distributing knowledge, as opposed to large amounts of raw data, the knowledge networking system 100 may mitigate large delays and overhead which is not tolerable in time-critical responses.

In the example of in FIG. 1, a knowledge cycle can involve the computer system 140 collecting vehicle sensor data from, at least, vehicle 130 and performing knowledge creation from that data. Then, during a knowledge creation stage of the knowledge cycle, an AI/ML modeling approach can be applied to the collected data to create knowledge. Knowledge can be created by a single and/or cluster of vehicles cooperatively or it can be created at the edge through collaboratively collected data from vehicles. The knowledge creation includes all the vehicles inside the cluster but might potentially also be extended to surrounding vehicles or a specific region. The created knowledge is associated with a set of knowledge tags and stored in KB. The knowledge can be placed on edge/cloud server according to mobility of vehicles approaching the risky zone. The system uses Vehicle-to-Cloud communication to network the knowledge. The knowledge is transferred to other locations according to geometry features of road sections. The knowledge is composed with another knowledge based on similarity and used parameter is time of day. The knowledge cycle includes all steps, and the performance is beneficial (i.e., knowledge is delivered to more high number of vehicles.

As used herein, the words "geographic location," "location," "geographic position" and "position" refer to a latitude and longitude of an object (or, a latitude, longitude, and elevation of an object), such as a connected vehicle, an RSE, a client device, etc. As used herein, the words "geographic area", and "area," refer to a physical space surrounding a geographic location (e.g., an area of defined space surrounding a geographic location or position).

Figure 3:
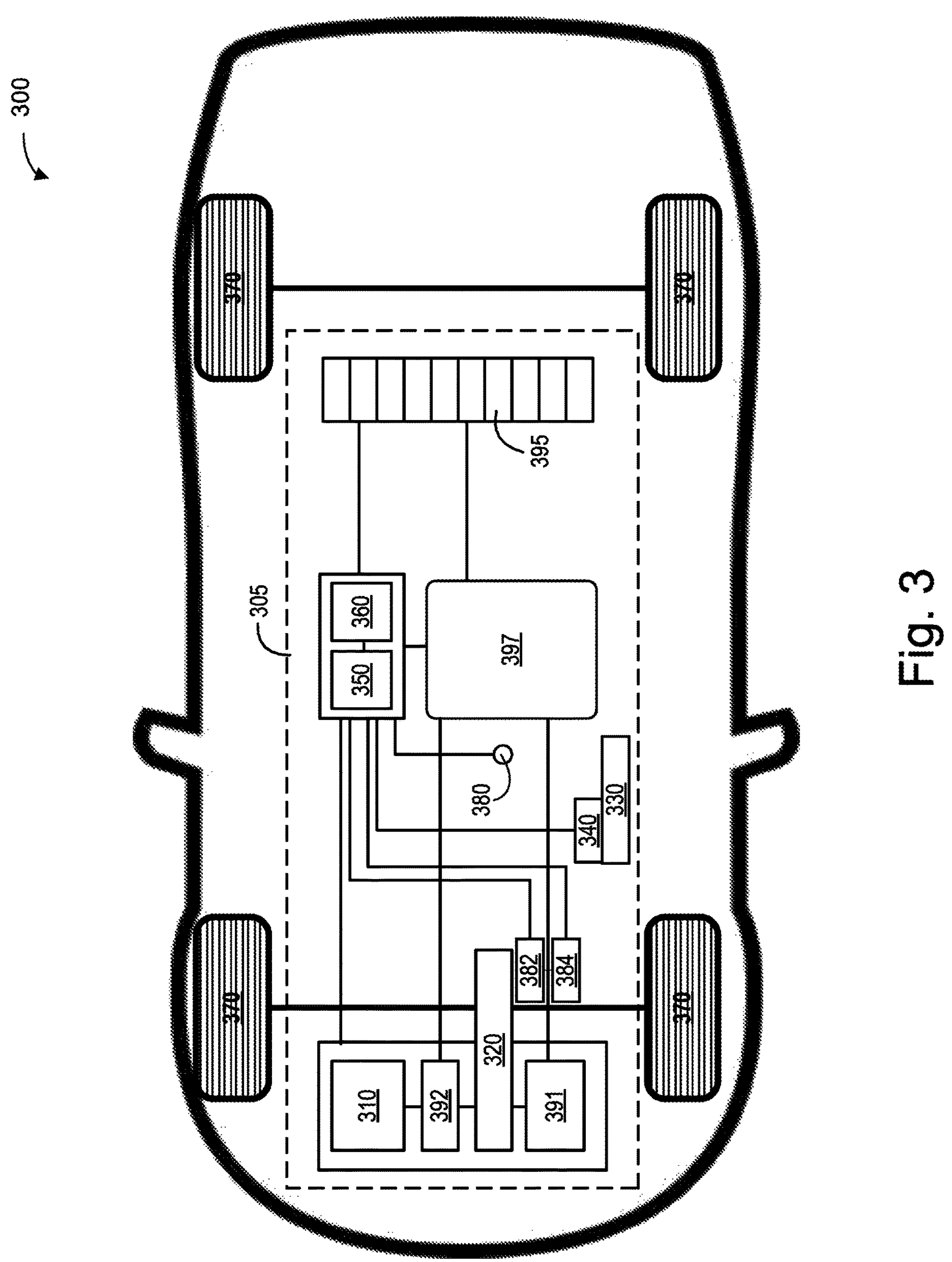
FIG. 3 depicts an example vehicle in which the systems and methods disclosed herein may be applied.

FIG. 3 illustrates an example hybrid electric vehicle (HEV) 300 in which various embodiments for vehicular knowledge networking including improved knowledge cycle are implemented. For example, in one embodiment, the ego vehicle 130 (shown in FIG. 1) is a HEV 300. It should be understood that various embodiments disclosed herein may be applicable to/used in various vehicles (internal combustion engine (ICE) vehicles, fully electric vehicles (EVs), etc.) that are fully or partially autonomously controlled/operated, and not solely HEVs.

Here, HEV 300 includes drive force unit 305 and wheels 370. Drive force unit 305 includes an engine 310, motor generators (MGs) 391 and 392, a battery 395, an inverter 397, a brake pedal 330, a brake pedal sensor 340, a transmission 320, a memory 360, an electronic control unit (ECU) 350, a shifter 380, a speed sensor 382, and an accelerometer 384.

Engine 310 primarily drives the wheels 370. Engine 310 can be an ICE that combusts fuel, such as gasoline, ethanol, diesel, biofuel, or other types of fuels which are suitable for combustion. The torque output by engine 310 is received by the transmission 320. MGs 391 and 392 can also output torque to the transmission 320. Engine 310 and MGs 391 and 392 may be coupled through a planetary gear (not shown in FIG. 3). The transmission 320 delivers an applied torque to the wheels 370. The torque output by engine 310 does not directly translate into the applied torque to the wheels 370.

MGs 391 and 392 can serve as motors which output torque in a drive mode, and can serve as generators to recharge the battery 395 in a regeneration mode. The electric power delivered from or to MGs 391 and 392 passes through inverter 397 to battery 395. Brake pedal sensor 340 can detect pressure applied to brake pedal 330, which may further affect the applied torque to wheels 370. Speed sensor 382 is connected to an output shaft of transmission 320 to detect a speed input which is converted into a vehicle speed by ECU 350. Accelerometer 384 is connected to the body of HEV 300 to detect the actual deceleration of HEV 300, which corresponds to a deceleration torque.

Transmission 320 is a transmission suitable for an HEV. For example, transmission 320 can be an electronically controlled continuously variable transmission (ECVT), which is coupled to engine 310 as well as to MGs 391 and 392. Transmission 320 can deliver torque output from a combination of engine 310 and MGs 391 and 392. The ECU 350 controls the transmission 320, utilizing data stored in memory 360 to determine the applied torque delivered to the wheels 370. For example, ECU 350 may determine that at a certain vehicle speed, engine 310 should provide a fraction of the applied torque to the wheels while MG 391 provides most of the applied torque. ECU 350 and transmission 320 can control an engine speed (NE) of engine 310 independently of the vehicle speed (V).

ECU 350 may include circuitry to control the above aspects of vehicle operation. ECU 350 may include, for example, a microcomputer that includes a one or more processing units (e.g., microprocessors), memory storage (e.g., RAM, ROM, etc.), and I/O devices. ECU 350 may execute instructions stored in memory to control one or more electrical systems or subsystems in the vehicle. ECU 350 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 391 and 392 each may be a permanent magnet type synchronous motor including for example, a rotor with a permanent magnet embedded therein. MGs 391 and 392 may each be driven by an inverter controlled by a control signal from ECU 350 so as to convert direct current (DC) power from battery 395 to alternating current (AC) power, and supply the AC power to MGs 391, 392. MG 392 may be driven by electric power generated by motor generator MG 391. It should be understood that in embodiments where MG 391 and MG 392 are DC motors, no inverter is required. The inverter, in conjunction with a converter assembly may also accept power from one or more of MGs 391, 392 (e.g., during engine charging), convert this power from AC back to DC, and use this power to charge battery 395 (hence the name, motor generator). ECU 350 may control the inverter, adjust driving current supplied to MG 392, and adjust the current received from MG 391 during regenerative coasting and braking.

Battery 395 may be implemented as one or more batteries or other power storage devices including, for example, lead-acid batteries, lithium ion, and nickel batteries, capacitive storage devices, and so on. Battery 395 may also be charged by one or more of MGs 391, 392, such as, for example, by regenerative braking or by coasting during which one or more of MGs 391, 392 operates as generator. Alternatively (or additionally, battery 395 can be charged by MG 391, for example, when HEV 300 is in idle (not moving/not in drive). Further still, battery 395 may be charged by a battery charger (not shown) that receives energy from engine 310. The battery charger may be switched or otherwise controlled to engage/disengage it with battery 395. For example, an alternator or generator may be coupled directly or indirectly to a drive shaft of engine 310 to generate an electrical current as a result of the operation of engine 310. Still other embodiments contemplate the use of one or more additional motor generators to power the rear wheels of a vehicle (e.g., in vehicles equipped with 4-Wheel Drive), or using two rear motor generators, each powering a rear wheel.

Battery 395 may also be used to power other electrical or electronic systems in the vehicle. Battery 395 can include, for example, one or more batteries, capacitive storage units, or other storage reservoirs suitable for storing electrical energy that can be used to power MG 391 and/or MG 392. When battery 395 is implemented using one or more batteries, the batteries can include, for example, nickel metal hydride batteries, lithium ion batteries, lead acid batteries, nickel cadmium batteries, lithium ion polymer batteries, and other types of batteries.

Figure 4:
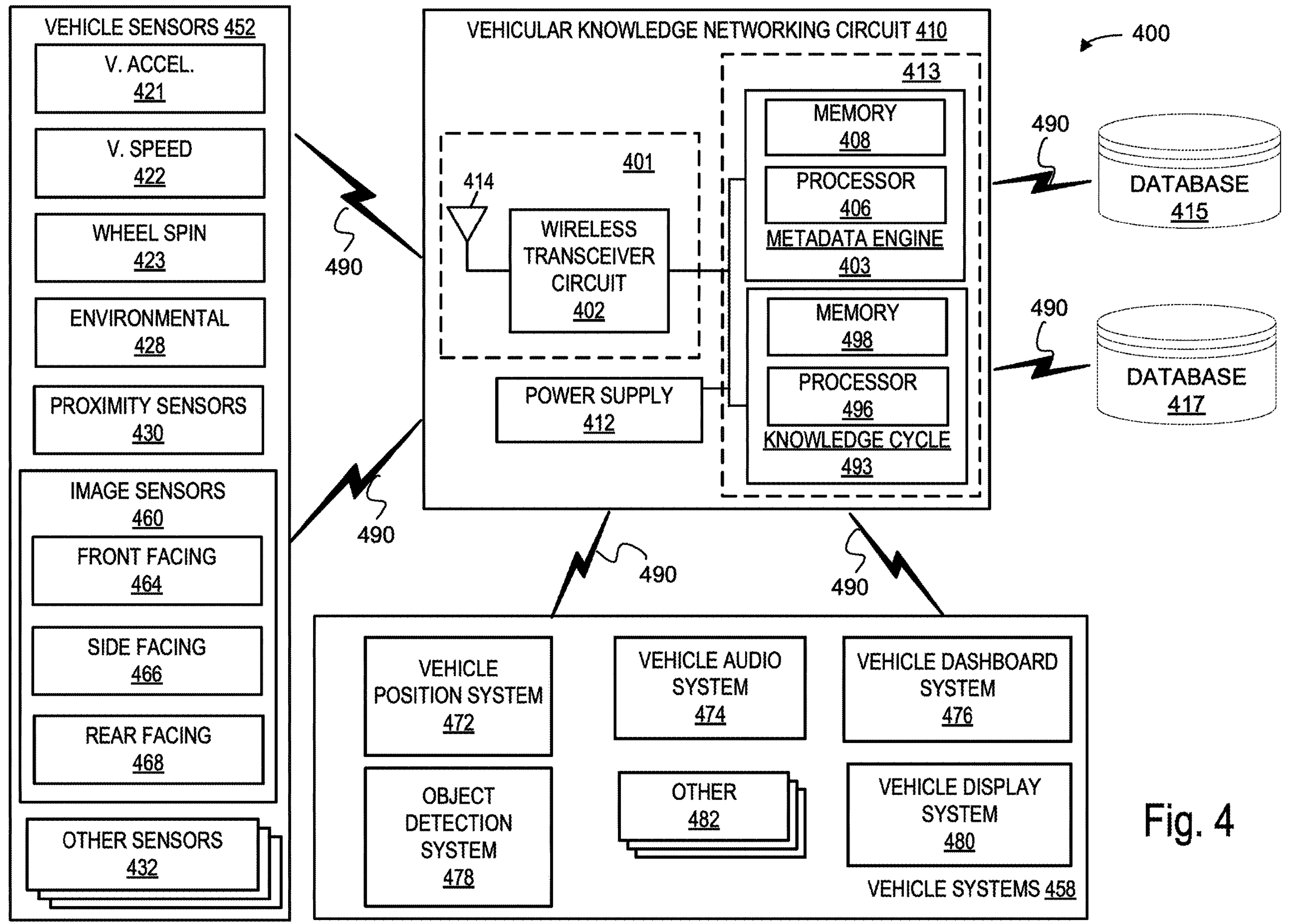
FIG. 4 depicts an example network architecture of an in-vehicle vehicular knowledge networking system, for example the vehicular knowledge network shown in FIG. 1, according to one embodiment.

FIG. 4 illustrates an example of a vehicular knowledge networking system 400 in an ego vehicle in accordance with one embodiment of the systems and methods described herein. The vehicular knowledge networking system 400 includes a vehicular knowledge networking circuit 410 communicatively connected to a plurality of sensors 452, a plurality of vehicle systems 458, a database 415 comprising roadway data, and a database 417 comprising right-of-way rules. Sensors 452 and vehicle systems 458 wirelessly communicate with the vehicular knowledge networking circuit 410. Although in this example sensors 452 and vehicle systems 458 are depicted as communicating with vehicular knowledge networking circuit 410, they can also communicate with each other as well as with other vehicle systems. The vehicular knowledge networking circuit 410 can be implemented as an ECU or as part of an ECU. In other embodiments, the vehicular knowledge networking circuit 410 can be implemented independently of the ECU.

The vehicular knowledge networking circuit 410 in this example includes a communication circuit 401, a controller/CPU 413 comprising a metadata engine 403, and a knowledge cycle engine 493, and a power supply 412. Each engine includes a respective processor 406, 496 and respective memory 408, 498. For example, the metadata engine 403 includes a processor 406, and a memory 408, and the knowledge cycle engine 493 includes a processor 496 and a memory 498 configured for performing the improved knowledge cycle functions described herein.

Processor 406 can include one or more GPUs, CPUs, microprocessors, or any other suitable processing system. Processor 406 may include a single core or multicore processors. The memory 408 may include one or more various forms of memory or data storage (e.g., flash, RAM, etc.) that may be used to store instructions and variables for processor 406 as well as any other suitable information, such as, one or more of the following elements: rules data; resource data; GPS data; and base data, as described below. Memory 408 can be made up of one or more modules of one or more different types of memory, and may be configured to store data and other information as well as operational instructions that may be used by the processors 406 and 496.

Although the example of FIG. 4 is illustrated using processor and memory circuitry, as described below with reference to circuits disclosed herein, controller/CPU 413 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up the vehicular knowledge networking circuit 410. Communication circuit 401 includes either or both a wireless transceiver circuit 402 with an associated antenna 414 and a wired I/O interface with an associated hardwired data port (not illustrated). Communication circuit 401 can provide for V2X communications capabilities, allowing the knowledge hub circuit 410 to communicate with edge devices, such as roadside equipment (RSE), network cloud servers and cloud-based databases, and/or other vehicles.

As this example illustrates, communications with the knowledge hub circuit 410 can include either or both wired and wireless communications circuits 401. Wireless transceiver circuit 402 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 414 is coupled to wireless transceiver circuit 402 and is used by wireless transceiver circuit 402 to transmit radio signals wirelessly to wireless equipment with which it is connected and to receive radio signals as well. These RF signals can include information of almost any sort that is sent or received by the vehicular knowledge networking circuit 410 to/from other entities such as sensors 452 and vehicle systems 458.

Power supply 412 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

In the illustrated example, sensors 452 include vehicle acceleration sensors 421, vehicle speed sensors 422, wheelspin sensors 423 (e.g., one for each wheel), environmental sensors 428 (e.g., to detect salinity or other environmental conditions), proximity sensor 430 (e.g., sonar, radar, lidar or other vehicle proximity sensors), and image sensors 460. Additional sensors (i.e., other sensors 432) can be included as may be appropriate for a given implementation of vehicular knowledge networking system 400.

The sensors 452 include front facing image sensors 464, side facing image sensors 466, and/or rear facing image sensors 468. Image sensors may capture information which may be used in detecting not only vehicle conditions but also detecting conditions external to the ego vehicle 130 as well. Image sensors that might be used to detect external conditions can include, for example, cameras or other image sensors configured to capture data in the form of sequential image frames forming a video in the visible spectrum, near infra-red (IR) spectrum, IR spectrum, ultraviolet spectrum, etc. Image sensors 460 can be used to, for example, to detect objects in an environment surrounding ego vehicle 130, for example, traffic signs indicating a current speed limit, road curvature, obstacles, surrounding vehicles, and so on. For example, one or more image sensors 460 may capture images of neighboring vehicles in the surrounding environment. As another example, object detecting and recognition techniques may be used to detect objects and environmental conditions, such as, but not limited to, road conditions, surrounding vehicle behavior (e.g., driving behavior and the like), parking availability, etc. Additionally, sensors may estimate proximity between vehicles. For instance, the image sensors 460 may include cameras that may be used with and/or integrated with other proximity sensors 430 such as LIDAR sensors or any other sensors capable of capturing a distance. As used herein, a sensor set of a vehicle may refer to sensors 452 and image sensors 460 as a set.

Vehicle systems 458 include any of a number of different vehicle components or subsystems used to control or monitor various aspects of the vehicle and its performance. In this example, the vehicle systems 458 includes a vehicle positioning system 472; vehicle audio system 474 comprising one or more speakers configured to deliver audio throughout the vehicle; object detection system 478 to perform image processing such as object recognition and detection on images from image sensors 460, proximity estimation, for example, from image sensors 460 and/or proximity sensors, etc. for use in other vehicle systems; vehicle display system 480; and other vehicle systems 482 (e.g., Advanced Driver-Assistance Systems (ADAS), such as forward/rear collision detection and warning systems, pedestrian detection systems, autonomous or semi-autonomous driving systems, and the like).

The vehicle positioning system 472 includes a global positioning system (GPS). Ego vehicle 130 and the one or more connected vehicles 104A-104C may be DSRC-equipped vehicles. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

Conventional GPS communication includes a GPS satellite in communication with a vehicle comprising a GPS tracking device. The GPS tracking device emits/receives a signal to/from the GPS satellite. For example, a GPS tracking device is installed into a vehicle. The GPS tracking device receives position data from the GPS tracking device. The position data gathered from the vehicle is stored in the tracking device. The position data is transmitted to the cloud server via a wireless network.

A conventional GPS provides positional information that describes a position of a vehicle with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the location of the vehicle with lane-level accuracy. In addition, the current standard for DSRC requires that the location of the vehicle be described with lane-level accuracy.

As used herein, the words "geographic location," "location," "geographic position" and "position" refer to a latitude and longitude of an object (or, a latitude, longitude, and elevation of an object), such as a connected vehicle, an RSE, a client device, etc. As used herein, the words "geographic area", and "area," refer to a physical space surrounding a location (e.g., an area of defined space surrounding a geographic location or geographic position). The example embodiments described herein may provide positioning information that describes a geographic position of a vehicle with an accuracy of one or more of: (1) at least plus or minus 1.5 meters in relation to the actual geographic position of the vehicle in two dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

Network 490 may be a conventional type of network, wired or wireless, and may have numerous different configurations including a star configuration, token ring configuration, or other configurations. Furthermore, the network 490 may include a local area network (LAN), a wide area network (WAN) (e.g., the Internet), or other interconnected data paths across which multiple devices and/or entities may communicate. In some embodiments, the network may include a peer-to-peer network. The network may also be coupled to or may include portions of a telecommunications network for sending data in a variety of different communication protocols. In some embodiments, the network 490 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, Wi-Fi (infrastructure mode), Wi-Fi (ad-hoc mode), visible light communication, TV white space communication and satellite communication. The network may also include a mobile data network that may include 3G, 4G, 5G, LTE, LTE-V2V, LTE-V2I, LTE-V2X, LTE-D2D, VoLTE, 5G-V2X or any other mobile data network or combination of mobile data networks. Further, the network 490 may include one or more IEEE 802.11 wireless networks.

In one embodiment, data comprising the location of vehicle is captured by the vehicle position system 472. The vehicle position system 472 can include one or more sensors 452 configured to capture vehicle position data. The vehicle positioning system 472 communicates with the vehicular knowledge networking circuit 410 to communicate and utilize knowledge at the ego vehicle 130 for various driving and/or maneuvering functions, including autonomous or semi-autonomous vehicle/driver safety features (e.g., related to risk reasoning).

In an embodiment, the vehicular knowledge networking system 400 produces notifications for the driver of the ego vehicle 130 using one or more notification methods. For example, the driver may receive a visual and/or audible notification that they are approaching an identified risky zone, based on knowledge the vehicular knowledge networking circuit 410 has received in accordance with knowledge networking capabilities, as disclosed herein. In one embodiment, the notification methods include the vehicle systems 458 comprising the vehicle audio system 474 and the vehicle dashboard system 476. The notification methods includes visual and/or audible methods of informing the driver of safety related issues. In one embodiment, the notification methods include notifying the driver of the ego vehicle 130 via one or more vehicle systems 458. For example, in one embodiment, the driver is notified of riskiness of a driving environment via the vehicle audio system 474 (e.g., instructions played/broadcasted over one or more vehicle speakers), the vehicle display system 480 and/or the vehicle dashboard system 476. In one embodiment, the driver is notified of safety issues by a navigation system within the instrument cluster and the dashboard GUI. The notification can include visual instructions (e.g., visual directions on how to proceed), and/or auditory instructions (e.g., verbal commands from the vehicular knowledge networking system 400 to the driver).

Figure 5:
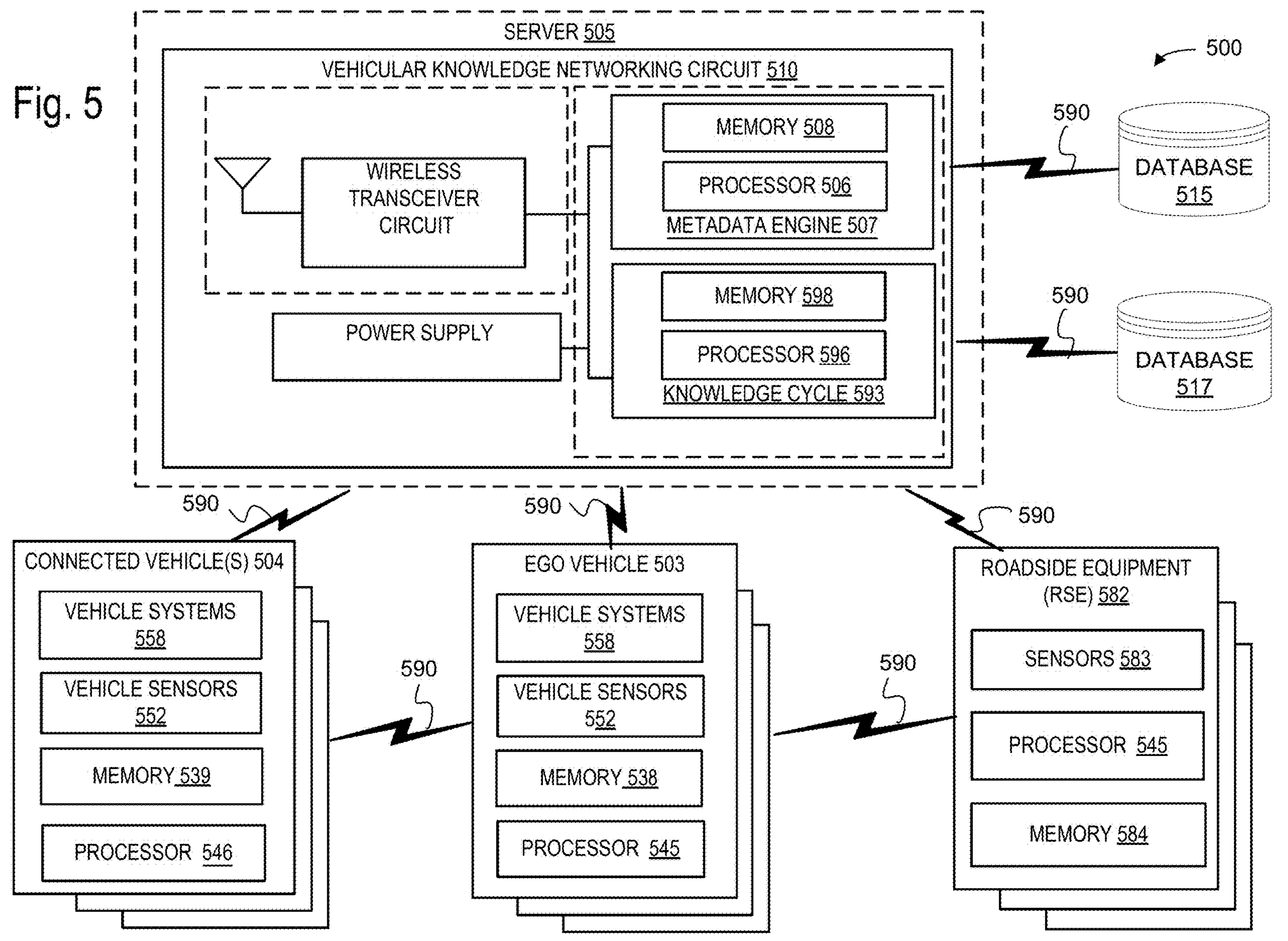
FIG. 5 depicts an example network architecture of a remote vehicular knowledge networking system, for example the vehicular knowledge networking system of FIG. 1, according to one embodiment.

FIG. 5 is an example a vehicular knowledge networking system 500 implemented in an entity external and/or remote to the ego vehicle 130 (shown in FIG. 1). In this example, a vehicular knowledge networking circuit 510 implementing the disclosed vehicular knowledge networking and improved knowledge cycle capabilities is included in server 505, shown as a cloud/edge server. Accordingly, the system 500 utilizes a V2X network architecture in accordance with various embodiments disclosed herein. The network architecture includes the cloud server 505 comprising the vehicular knowledge networking circuit 510, a connected vehicle 504 (e.g., vehicles 104A-104C), the ego vehicle 503 and a roadside equipment (RSE) 582 infrastructure component of a roadway. RSE 582 includes sensors 583, a processor 545 and memory 584. The sensors 583, processor 545 and memory 584 can be the same as/similar to vehicle sensors 552, processor 506, processor 596, memory 508 or memory 598. The cloud server 505, connected vehicle 504 and ego vehicle 503 and RSE 582 can all communicate with one another. For example, connected vehicle 504 can communicate with the ego vehicle 503, and the ego vehicle 503 can communicate with the RSE 582. In some embodiments, connected vehicle 504 includes a communication circuitry comprising hardware and software that is needed to enable the connected vehicle 504 to communicate with the ego vehicle 503, RSE 582 and/or cloud server 505 via network 590. The ego vehicle is also a "connected vehicle", but for explanation purposes is referred to as the "ego vehicle". In one embodiment, the connected vehicle 504 includes the same or similar vehicle systems and sensors as the ego vehicle 503. Using one or more sensors and/or vehicle systems, the connected vehicle 504 can collaborate on the task of providing a precise location of the ego vehicle 503 by leveraging their respective sensor sets (e.g., sensors 452, systems 458, and/or image sensors 460 of FIG. 4).

In one embodiment, knowledge at the cloud server 505 (e.g., knowledge created and stored via vehicular knowledge networking circuit 510) requested by the ego vehicle 503 can be transmitted from cloud server 505 to the one or more connected vehicles 504 using V2X communication methods. In one embodiment, the V2I communication method includes ego vehicle 503 communication to the cloud server 505 via RSE 582. The vehicle's position can be determined using the RSE 582. The RSE 582 is in communication with the cloud server 505. For example, RSE can receive data comprising the location of the ego vehicle 503, and communicate the data to cloud server 505 via network 590. Inversely, the cloud server 505 can communicate either directly with the ego vehicle 503 via a C2V communication method or to the RSE, which can subsequently relay the data, including knowledge, from the cloud server 505 to the ego vehicle 503. In one embodiment, the V2V communication method includes ego vehicle 503 communication with one or more connected vehicles 504. The one or more connected vehicles 504 can communicate with the ego vehicle 503. In one embodiment, the one or more connected vehicles 504 may relay knowledge from the cloud server 505 to the ego vehicle 503. In one embodiment, the one or more connected vehicles 504 relay data from the ego vehicle 503 to the cloud server 505. In addition, when the one or more connected vehicles are within a proximity to other vehicles, they can create a local network and exchange data with the ego vehicle 503 forming a "hub" in a vehicular knowledge network.

As used herein, "connected vehicle" refers to a vehicle that is actively connected to edge devices, other vehicles, and/or a cloud server via a network through V2X communication comprising V2I, V2C, C2V and/or V2V communications. An "unconnected vehicle" refers to a vehicle that is not actively connected. That is, for example, an unconnected vehicle may include communication circuitry capable of wireless communication (e.g., V2X, V2I, V2V, etc.), but for whatever reason is not actively connected to other vehicles and/or communication devices. For example, the capabilities may be disabled, unresponsive due to low signal quality, etc. Further, an unconnected vehicle, in some embodiments, may be incapable of such communication, for example, in a case where the vehicle does not have the hardware/software providing such capabilities installed therein.

The V2X network is a communication network that enables entities such as elements of the operating environment to wirelessly communicate with one another via one or more of the following: Wi-Fi; cellular communication including 3G, 4G, LTE, 5G, etc.; Dedicated Short Range Communication (DSRC); millimeter wave communication; etc. The V2X includes V2I, V2C, C2V and/or V2V communications.

For example, connected vehicle 504 and ego vehicle 503 may have V2X communication capabilities, allowing vehicle 504 to communicate with RSE 582. For example, RSE 582 may be a vehicle-to-infrastructure (V2I)-enabled streetlight or camera. Connected vehicle 504 and ego vehicle 503 may also communicate with other connected vehicles over vehicle-to-vehicle (V2V) communications.

In one embodiment, data, such as knowledge, is received by the ego vehicle 503 from one or more connected vehicles 504 and/or RSE 582 via one or more V2X communication methods (e.g., V2I communication with RSE 582, V2C/C2V communication with the cloud server 505, and/or V2V communication with one or more connected vehicles 504). For example, in one embodiment knowledge regarding a shared driving environment, for example when all of the vehicles 503, 504 are traveling along the same roadway, can be transmitted from the one or more connected vehicles 504 to the ego vehicle 503. Furthermore, in one embodiment, knowledge can be transmitted from ego vehicle 503 to the cloud server 505 directly via V2C or C2V communication methods or via the RSE 582 as a relay to the cloud via V2I communication methods.

It should be understood that sometimes, a vehicle itself may act as a network node or edge computing device. For example, connected vehicle 504 may be a network edge device. The data gathered by the connected vehicle 504, either through their own sensors, or other data sources, e.g., RSE 582 and other vehicles, may be ultimately be transmitted to the cloud, e.g., the cloud server 505 and cloud-based memory 508 via network 590.

Cloud server 505 may be an edge server or a cloud server. The cloud server 505 can communicate with RSE 582, connected vehicle 504 and/or ego vehicle 503. The cloud server 505 may be one or more cloud-based instance of processor-based computing device communicatively connected to database 515, database 517, RSE 582, ego vehicle 503 and/or connected vehicle 504. The cloud server 505 may include circuitry to control various aspects of the vehicular knowledge networking system 500 described herein. Cloud server 505 may include, for example, a microcomputer that includes one or more processing units (e.g., microprocessors), memory storage (e.g., RAM, ROM, etc.), and I/O devices. As seen in FIG. 5, the cloud server 505 includes a metadata engine 507 comprising a memory 508 and a processor 506. The processor 506 is configured to execute instructions stored in memory 508. The instruction stored in memory 508 include instructions for creating and analyzing metadata related to improved knowledge cycle functions, as disclosed herein. The cloud server 505 further includes a knowledge cycle engine 593 comprising a memory 598 and a processor 596. The processor 596 is configured to execute instructions stored in memory 598. The instructions stored in memory 598 include instructions to execute the improved knowledge cycle functions, as disclosed herein, such as degradation mitigation and creation/distribution of knowledge.

The connected vehicle(s) 504 include vehicle systems 558, vehicle sensors 552, memory 539 and processor 546. The vehicle systems 558, vehicle sensors 552, memory 539 and processor 546 include the same and/or similar capabilities as the vehicle systems 558, vehicle sensors 552, memory 538 and processor 545 described herein. In embodiments where in the connected vehicle(s) include the ego vehicle 503 (i.e., the ego vehicle 503 is a "connected vehicle" that communicates with other connected vehicles 504, RSE 582 and/or cloud server 505 via one or more V2X methods of communication), the vehicles systems 558, vehicle sensors 552, memory 539 and processor 546 include vehicle systems 558, vehicle sensors 552, memory 538 and processor 545.

Referring now to FIG. 6, an example of a process 600 that implements an improved knowledge cycle technique, as disclosed herein, is depicted. In an example, the process 600 can be performed by a processor, CPU, or computer system that is executing functions of vehicular knowledge networking. In an embodiment, a processor and/or controller of a vehicle computer is implementing the process 600. As alluded to above, the knowledge cycle includes several stages, or steps, that are executed therein. Thus, in an example, a full knowledge cycle includes steps (e.g., five steps) starting from the beginning of the cycle at knowledge creation, proceeding to knowledge storage, knowledge networking, and so on, and returning back again to knowledge creation. Thus, the knowledge cycle can be thought of as an iterative process, that continues through the cycle of steps where the knowledge stays alive, being stored, updated and forwarded to the various entities in the vehicular knowledge network. In some instances, a knowledge cycle may be partial and includes a smaller subset (e.g., two steps-four steps) of the aforementioned steps (e.g., not requiring each of the aforementioned five steps to be executed). An example of a partial knowledge cycle is a cycle that begins with knowledge creation, and continues only to knowledge networking (e.g., not performing composition).

The knowledge cycle generally relates to the creation and consumption of knowledge within the vehicular knowledge network. Furthermore, a key concept of the disclosed embodiments is the improvement of the aforementioned knowledge cycle, by additionally creating and analyzing associated metadata that corresponds to each stage of the cycle. The metadata associated with the knowledge cycle can be analyzed and ultimately used to derive at least one path (e.g., a particular arrangement of stages of the knowledge cycle) within the knowledge cycle that is known to have a high performance (also referred to herein as "beneficial" stages of a knowledge cycle). Consequently, if there is any degradation of subsequent iterations of the knowledge cycle, the cycle can be improved by employing only the "beneficial" stages of the knowledge cycle (based on the metadata) in a manner that enhances the usefulness of the knowledge cycle (e.g., performance if beneficial/delivered to a high number of vehicles) and the corresponding knowledge. In other words, process 600 of FIG. 6 illustrates an improved knowledge cycle where performing each stage of the knowledge cycle additionally involves creating the corresponding metadata, and subsequently where this metadata is analyzed later in the process 800 in order to determine the "beneficial path" for the knowledge cycle.

In FIG. 6, the process 600 begins at operation 602 where the knowledge creation stage of the knowledge cycle is performed. Additionally, operation 602 involves creating metadata of creation, which is metadata that is directly associated with the creation stage. According to the embodiments, knowledge can be created in different by utilizing various methods and/or techniques. In terms of methods used to perform knowledge creation, various techniques have been used. Knowledge creation can be performed by operation 602 in accordance with a known data analysis technique, such as formal language techniques, model-based approaches, deep learning-based methods, and the like. With respect to model-based approaches, knowledge creation can involve performing clustering for knowledge extraction (where a set of objects is grouped in same cluster in terms of similarity) and seasonal-trend decomposition. Model-based knowledge creation can use mathematical models to extract hidden relationships, apply learning techniques to explore the inner relations. Thus, model-based knowledge creation can be modeled as multi-criteria decision making that involves more than one objective, where mathematical optimization methods are applied to optimize objectives simultaneously.

With respect to deep learning-based methods, knowledge creation in operation 602 can involve learning the inferences of hidden relationship in data, that is explored through deep learning approaches (e.g., machine learning). In some cases, by applying deep learning-based methods, knowledge is created by extracting representative features from input data. Therefore, knowledge created using deep learning-based methods can result in meaningful features or descriptors that have been extracted from collected data (e.g., raw sensor data from vehicles). An example of such knowledge created using a deep learning-based method is: [−5 C°, −3 C°, −2 C°] (e.g., data)→cold (e.g., knowledge).

With respect to formal language, knowledge creation in operation 602 can involve forming knowledge as descriptions in a formal language, such as propositional logic. For example, new knowledge can be created by a set of knowledge inference rules, which takes information at the information layer and/or the existing knowledge as input. In applying a formal language technique for knowledge creation, knowledge inference rules are described in a formal language, such as propositional logic as below:

when the tires are slippery, driving in high speed is dangerous

Slippery_Road>High_Speed⇒Danger

Time_is_6 pm⇒>HighTraffic V Holiday

The particular technique used to perform knowledge creation in operation 602 can be considered as a particular path for that knowledge cycle. For instance, in the current iteration of the knowledge cycle, knowledge creation may be performed in operation 602 using a model-based (e.g., clustering) method. Thus, the path for this current cycle includes a model-based, knowledge creation stage. However, in a subsequent iteration of the knowledge cycle, knowledge creation may be performed using deep learning-based. Accordingly, the subsequent knowledge cycle has a different path (compared to the previous knowledge cycle iteration), where the path for this subsequent cycle includes a deep learning-based, knowledge creation stage. As a result of creating knowledge in operation 602, a knowledge layer is formed on top of the vehicular network (e.g., V2V, V2C, etc.) by the knowledge cycle using a particular path (e.g., formal language, model based, deep learning-based, etc.), which allows understanding and/or context to be derived from the collected raw data.

Moreover, the improved knowledge cycle techniques, as disclosed herein, involves creating metadata for each stage of the knowledge cycle. Thus, operation 602 also includes creating metadata of creation, where the metadata of creation is metadata that particularly corresponds to the knowledge creation stage of the knowledge cycle. The metadata of creation provides additional information specifically about the knowledge creation stage of the knowledge cycle. Therefore, the metadata of creation supplements the created knowledge, where the metadata of creation can be separately analyzed to extract insight and/or inferred patterns about the creation stage of the knowledge cycle (e.g., which paths for knowledge creation are used/successful for the knowledge cycle) in order to ultimately optimize the knowledge cycle. Examples of metadata of creation that can be used includes, but it not limited to: type sensor data; noise level; data volume in information creation; the method of knowledge creation; and the like. In some embodiments, the metadata of creation is generated, stored, and distributed as data that is appended to the knowledge.

Next, the process 600 continues to operation 604 where the knowledge storage stage of the improved knowledge cycle is performed. After the knowledge creation is performed in previous operation 602, the created knowledge should be stored such that the maximum number of entities (e.g., vehicles) can benefit from the knowledge. As alluded to above, knowledge can be stored at various different entities in the vehicular knowledge network, for instance storing knowledge at a vehicle (e.g., vehicle's own knowledge base), storing knowledge among a cluster of connected vehicles (e.g., Vehicular Micro Cloud), or storing knowledge at a remote cloud and/or edge server. Thus, the knowledge storage stage of operation 604 can involve a determination of one or more locations/entities to store knowledge within the vehicular knowledge network, and a determination of how the knowledge is defined. For example, in order to maximize the benefits of knowledge, a location/entity of the vehicular knowledge network that is within a determined distance from the largest number of vehicles (e.g., central to cluster of vehicles) is used store, update and forward the knowledge. In some embodiments, knowledge is stored based on constraints and/or characteristics of the vehicle knowledge network, such as only storing knowledge at an entity that is within the V2V communication range (e.g., 300 meters) to ensure that V2V communication-enabled vehicles can access such knowledge. In some embodiments, operation 604 can involve leveraging dynamic information, such as how vehicles move over time (e.g., vehicle mobility) and which regions are more central in order to refine initial placement and place the knowledge in the location/entity to be most accessible and/or beneficial.

Accordingly, the knowledge storage stage of the improved knowledge cycle can utilize various forms of storage and/or placement, including, but not limited to: edge/cloud; vehicle; mobility aware; popularity based; dynamic caching; and the like. The particular technique used to perform knowledge storage in operation 604 can be considered as a particular path for that stage in the knowledge cycle. As an example, in the current iteration of the knowledge cycle, knowledge storage may be performed in operation 604 where the knowledge is stored at the edge/cloud having placement according to mobility aware techniques. Thus, the path for this current cycle includes an edge/cloud, mobility aware, knowledge storage stage. However, in a subsequent iteration of the knowledge cycle, knowledge storage may be performed where the knowledge is stored at the edge/cloud using popularity-based techniques. Accordingly, the subsequent knowledge cycle has a different path (compared to the previous knowledge cycle iteration), where the path for this subsequent cycle includes an edge/cloud, popularity-based, knowledge storage stage. By performing knowledge storage in operation 604, knowledge stays alive, and knowledge is accessibly maintained/stored, updated and forwarded such that relevant knowledge can be accessed by vehicles in a beneficial manner.

Additionally, the operation 604 also includes creating metadata of storage, where the metadata of storage is metadata that particularly corresponds to the knowledge storage stage of the knowledge cycle. The metadata of storage provides additional information specifically about the knowledge storage stage of the knowledge cycle. The metadata of storage supplements the created knowledge, where the metadata of storage can be separately analyzed to extract insight and/or inferred patterns about where/how the knowledge stored in the knowledge cycle (e.g., which paths for knowledge storage are used/successful for the knowledge cycle) in order to ultimately optimize the knowledge cycle. Examples of metadata of storage includes, but is not limited to: type sensor data; type of storage entity; knowledge placement method; knowledge replacement method; and the like. In some embodiments, the metadata of storage is generated, stored, and distributed as data that is appended to the knowledge.

Subsequently, at operation 606, the knowledge networking stage of the improved knowledge cycle is performed, which relates to the distribution of knowledge through the vehicular network. Generally, after knowledge storage is performed in previous operation 604, one or more entities in the vehicular knowledge network can submit a knowledge query, and subsequently the knowledge is retrieved according to specified parameters. Entities, such as connected vehicles in the vehicular knowledge network, can forward a query and find the right knowledge that fits the particular needs of the requestor. As previously described, various types of connectivity can be employed in the vehicular knowledge network. For instance, vehicles communicate with each other and the remote cloud and/or the edge server through the V2V and V2C communication, respectively. In some embodiments, the knowledge networking in operation 606 involves a determination regarding the type of communication used (e.g., V2V, V2I, V2C, etc.), and a determination of the query forwarding method that is utilized, often based on a desired characteristic, such as minimizing delay. As an example of knowledge networking, knowledge may be kept up-to-date over V2C communication and connected vehicles approaching these zones that may benefit from such knowledge can access it over short-range before they reach the core area of the traffic incident from edge servers. In some cases, knowledge networking allows vehicles to use free spectrum (e.g., V2V communication) to download knowledge rather than requesting it from an edge/cloud server, which reduces the cellular communication cost significantly. Additionally, in some cases, a Vehicular Micro Cloud behaves as a virtual edge server that can store, update and forward knowledge.

Thus, in operation 606, a knowledge networking stage of the improved knowledge cycle can involve utilizing various types of communication/networking technologies, including but not limited to: V2C; V2V; V2N; Vehicular Micro Cloud; and the like. The particular technology that is used to perform an instance of knowledge networking in operation 606 can be considered as a particular path for that stage in the knowledge cycle. For example, in the current iteration of the knowledge cycle, knowledge networking may be performed in operation 606 where the knowledge is communicated using V2V. Thus, the path for this current cycle includes an V2V knowledge networking stage. However, in a subsequent iteration of the knowledge cycle, knowledge networking may be performed where the knowledge is communicated using V2C. Accordingly, the knowledge cycle has an initial path of a V2V knowledge networking stage, and a different subsequent path having V2C knowledge networking stage. Consequently, performing the knowledge networking stage of an improved knowledge cycle, in operation 606, facilitates the intelligent and efficient distribution of knowledge such that vehicle(s) can obtain relevant knowledge in a timely fashion.

Also, operation 606 involves creating metadata of networking, where the metadata of networking is metadata that particularly corresponds to the knowledge networking stage of the knowledge cycle. The metadata of networking provides additional information specifically about the knowledge networking stage of the knowledge cycle. The metadata of networking supplements the created knowledge, where the metadata of networking can be separately analyzed to extract insight and/or inferred patterns about which networking technologies are used in the knowledge cycle (e.g., which paths for knowledge networking are used/successful for the knowledge cycle) in order to ultimately optimize the knowledge cycle. Examples of metadata of networking includes, but is not limited to: type of communication, period of communication, form of communication (e.g., peer-to-peer, group communication); and the like. In some embodiments, the metadata of networking is generated, stored, and distributed as data that is appended to the knowledge.

Thereafter, operation 608 involves a knowledge refining stage of the improved knowledge cycle, which relates to accumulating and/or merging knowledge. According to the embodiments, the refining stage can include performing knowledge transfer and/or knowledge composition. Thus, knowledge transfer functions can be performed in operation 608. Generally, knowledge transfer involves transferring knowledge from one environment to be applied to another environment, when the two environments share similarities and/or share context. In a similarity-based knowledge transfer, first it must be determined whether the entities/environments similar. Features from disparate environments are compared in order to determine if they are similar. For example, a roundabout in a first driving environment and a roundabout in a second driving environment can share almost the same geometric properties (e.g., lane number, number of entrances, number of exist, etc.). Thus, in operation 608, it can be determined that the roundabouts are "similar" based on elected features; and further determined that the knowledge can be transferred based on the similarities, for instance transferring knowledge from the first roundabout to the second roundabout. Also, in order to perform knowledge transfer, operation 608 can include determining which method(s), features, characteristics, parameters, and the like, are used and/or most suitable to determines similarity; and which conditions (e.g., a degree of similarity) must be met in order for the knowledge from one environment can be transferred to another. Accordingly, with respect to knowledge transfer, paths for the knowledge refinement stage can include: context-aware, knowledge transfer; similarity-based, knowledge transfer; and the like.

In addition, the knowledge refinement stage in operation 608 can include knowledge composition. Knowledge composition merges generated knowledge (e.g., knowledge created by different entities) in order to create new knowledge. Knowledge can be created by different entities with different methods. In such case, knowledge may be combined/merged according to various rules, criteria, and methods, which ultimately creates a form a new knowledge and maximizes its benefits. For example, a first type of connected vehicles can create a first set of knowledge, like exit probability of a roundabout, and second type of connected vehicles can create a second set of knowledge, also about the exit probability of the roundabout. As a result, there are different sets of knowledge that have been created using different methods. Continuing with this example, by performing knowledge composition in operation 608, new knowledge regarding the exit probability of a roundabout, can be formed by combining/merging both the first and second sets of knowledge. Accordingly, operation 808 can include determining what knowledge can be merged, under what conditions, and merging the knowledge that satisfies the aforementioned criteria. Therefore, with respect to knowledge composition, paths for the knowledge refinement stage can include: similarity-based; time of creation; location of creation; and the like. Also, operation 606 involves creating metadata of networking, where the metadata of networking is metadata that particularly corresponds to the knowledge networking stage of the knowledge cycle. The metadata of networking provides additional information specifically about the knowledge networking stage of the knowledge cycle. The metadata of networking supplements the created knowledge, where the metadata of networking can be separately analyzed to extract insight and/or inferred patterns about which networking technologies are used in the knowledge cycle (e.g., which paths for knowledge networking are used/successful for the knowledge cycle) in order to ultimately optimize the knowledge cycle. Examples of metadata of networking includes, but is not limited to: type of communication, period of communication, form of communication (e.g., peer-to-peer, group communication); and the like. In some embodiments, the metadata of networking is generated, stored, and distributed as data that is appended to the knowledge.

Furthermore, operation 608 involves creating metadata of refinement, where the metadata of refinement is metadata that particularly corresponds to the knowledge refinement stage (e.g., knowledge transfer and/or knowledge composition) of the knowledge cycle. The metadata of refinement provides additional information specifically about the knowledge refinement stage of the knowledge cycle. The metadata of refinement supplements the created knowledge, where the metadata of refinement can be separately analyzed to extract insight and/or inferred patterns about which paths of knowledge transfer and/or knowledge composition are used in the knowledge cycle (e.g., which paths for knowledge refinement are used/successful for the knowledge cycle) in order to ultimately optimize the knowledge cycle. Examples of metadata of refinement for knowledge transfer includes, but is not limited to: the parameters to decide the transfer; transferring method/communication; the path of transfer; and the like. Examples of metadata of refinement for knowledge composition includes, but is not limited to: parameter set in composition determination; the method of knowledge composition; and the like. In some embodiments, the metadata of networking is generated, stored, and distributed as data that is appended to the knowledge.

Next, the process 600 continues to operation 610, where a beneficial path for the knowledge cycle performed in previous steps 602-608 is determined. As alluded to above, a key goal of vehicular knowledge networking is maximizing the benefits of the cycle, and the knowledge itself. In other words, it may be desirable to optimize a knowledge cycle such the knowledge from the cycle is utilized by a high number of vehicles, which indicates that the cycle is beneficial and/or successful. Thus, process 600 distinctly leverages this concept of a "beneficial" cycle and ties this to a quantifiable metric to measure the performance of the knowledge cycle. For example, the number of entities that utilize knowledge (e.g., send a request for knowledge) is a specific quantity that can be measured and used as performance indicator for the knowledge cycle. Thus, a knowledge cycle can be determined to be successful and/or high performing, if the knowledge from the cycle is delivered to a large number of entities. Further, if the knowledge cycle is successful, it can be considered to be beneficial. To this end, it is possible to analyze a knowledge cycle, for example applying machine learning (ML) techniques, to learn the repetitive patterns of successful knowledge cycles and infer which particular stages are most used in the successful knowledge cycles. Ultimately, the inference can extract beneficial stages to further infer at least one path (or a particular arrangement of stages) in the knowledge cycle that is beneficial.

Particularly, the metadata generated in previous operations 602-608, namely each stage of the knowledge cycle, is analyzed in operation 610. As an example, operation 610 can receive as input: the metadata of creation (e.g., corresponding to the knowledge creation stage) generated in operation 602; the metadata of storage (e.g., corresponding to the knowledge storage stage) generated in operation 604; the metadata of networking (e.g., corresponding to the knowledge networking stage) generated in operation 606; and the metadata of refining, including metadata of transfer and/or metadata of composition (e.g., corresponding to the knowledge refining stage) generated in operation 608, and analyzed by applying one or more ML models to the data. Over time, after several iterations of knowledge cycles are executed, the ML models can learn repeating patterns for the successful knowledge cycles (e.g., knowledge used by a high number of vehicles) and extract the "beneficial" stages, or stages that have a high repetitive frequently, from these successful cycles. It is the metadata that is created for each stage, which provides data that can be analyzed in such a manner as to identify, model, and infer which stages are most frequently used in the successful knowledge cycles and thus infer which stages are beneficial. For example, operation 610 can collect and analyze metadata over several knowledge cycles within a vehicular knowledge network and determine that V2V knowledge networking and similarity-based knowledge transfer are repeating patterns for stages in the successful knowledge cycles. In other words, a high number of vehicles in the vehicular knowledge network use knowledge that has been created from knowledge cycles utilizing V2V knowledge networking (knowledge networking stage) and similarity-based knowledge transfer (knowledge refining stage). Then, it can be inferred from the analysis in operation 610 that there are two beneficial stages associated with successful knowledge cycles, namely the V2V knowledge networking is a "beneficial" stage, and similarity-based knowledge transfer is a "beneficial" stage, in this example.

In some embodiments, the output from operation 610 is an improved knowledge cycle having a beneficial path. That is, a composite of only the beneficial stages are included the beneficial path for the improved knowledge cycle. In some cases, operation 610 determines a beneficial stage for each stage in the knowledge cycle. That is, one beneficial stage is determined for knowledge creation, knowledge storage, knowledge networking, and knowledge refining, respectively. Alternatively, in some cases, only stages that have a high occurrence frequency are deemed "beneficial" and included in the beneficial path for the improved knowledge cycle. In this embodiment, operation 610 provides one or more beneficial stages in the beneficial path for the improved knowledge cycle (e.g., less than the total number of stages in the knowledge cycle). Continuing with the previous example, in this embodiment, if V2V knowledge networking and similarity-based knowledge transfer are the only identified "beneficial" stages, then the beneficial path for the improved knowledge cycle will include only two stages (e.g., V2V knowledge networking, and similarity-based knowledge transfer).

According to the embodiments, the beneficial path generated by operation 610 can be employed to optimize and/or improve the knowledge cycle, when it has been determined that the performance of the knowledge cycle is degraded. Restated, when performance degradation of the knowledge cycle is detected, the output from operation 610 provides the insight of the beneficial path as alternatives for executing the knowledge cycle in order to improve its performance. For instance, subsequent to determining the beneficial path in operation 610, later iterations of the knowledge cycle can be modified by changing its execution to only include the beneficial stages. Referring again to the previous example, after determining the beneficial path for a knowledge cycle in operation 610, other instances of knowledge cycles can be improved for optimal performance by modifying the cycles to execute the one or more beneficial stages (from the determined beneficial path). Continuing with the example, improving knowledge cycles to optimize the performance involves changing all knowledge networking stages of the cycles to only perform the "beneficial" V2V knowledge networking, and changing all the knowledge refining stages to only perform the "beneficial" similarity-based knowledge transfer. Accordingly, the disclosed improved knowledge cycle techniques implemented by process 600 realizes a plethora of advantages associated with ensuring optimal performance for knowledge cycles, such as enhancing the degree of knowledge benefits (e.g., knowledge us useful to more vehicles).

Figure 7:
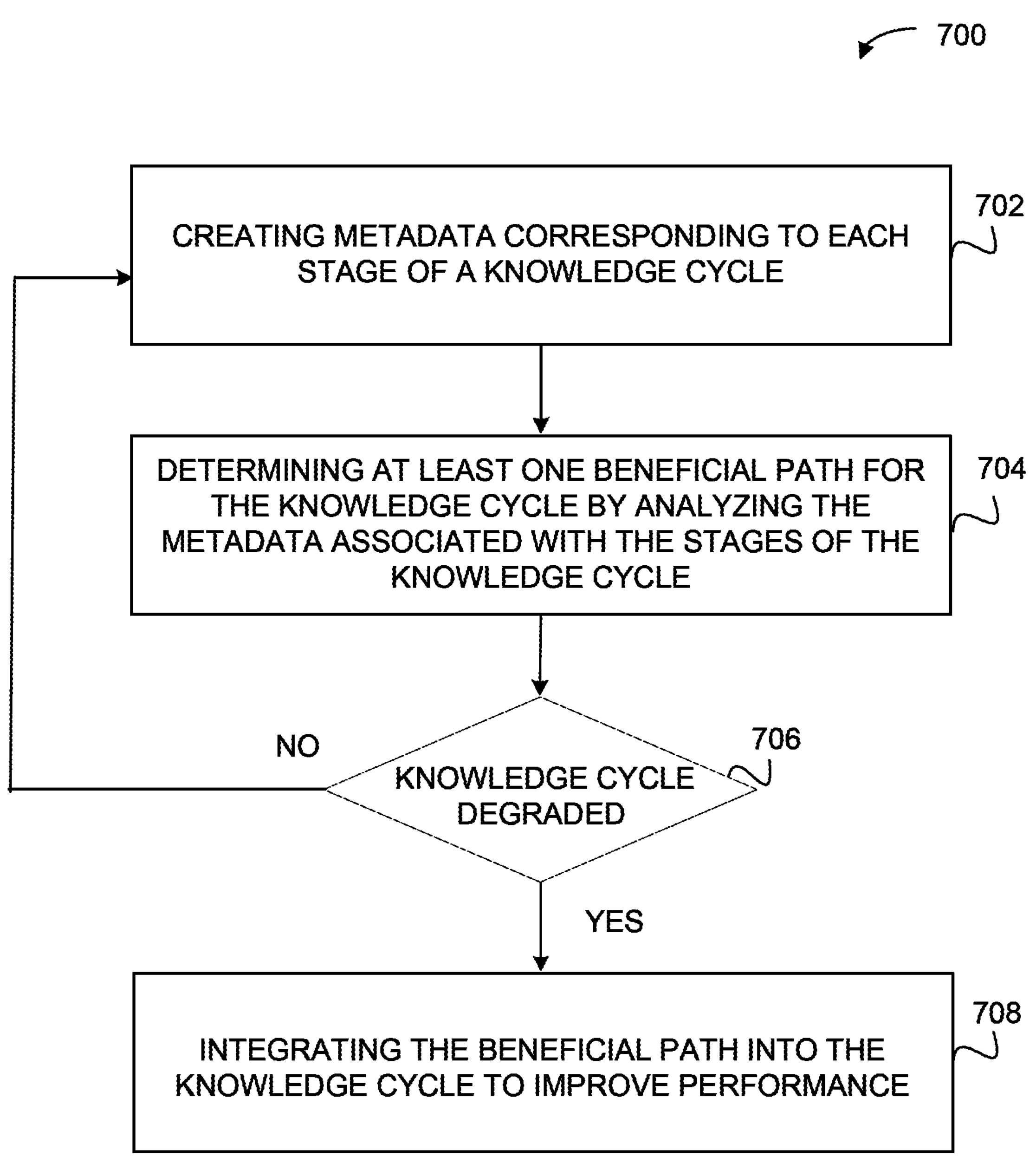
FIG. 7 depicts another example of a method of implementing an improved knowledge cycle including adapting for cycle degradation, according to one embodiment.

FIG. 7 depicts an example of a method 700, particularly illustrating functions related to the improved knowledge cycle aspects of the disclosed embodiments, including creating and analyzing metadata relating to the knowledge cycle, and utilizing this metadata to ultimately mitigate degradation of the knowledge cycle. In an example, the process 700 can be performed by a processor, CPU, or computer system that is executing functions of vehicular knowledge networking. In an embodiment, a processor and/or controller of a vehicle computer is implementing the process 700. As alluded to above, the knowledge cycle includes several stages, or steps, that are executed therein.

Figure 8:
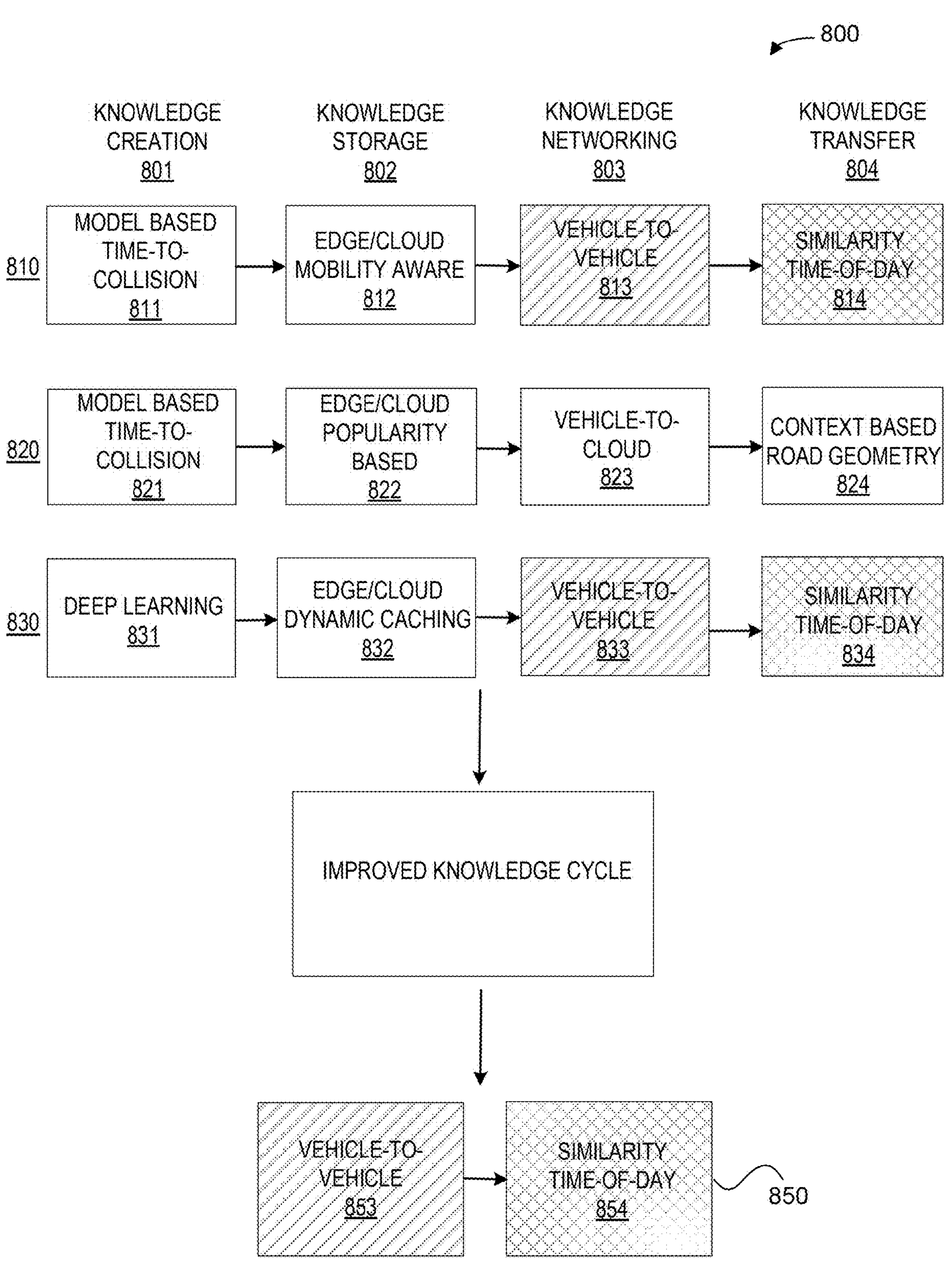
FIG. 8 depicts a conceptual diagram of implementing the improved knowledge cycle, according to one embodiment.

The process 700 begins at operation 702 for creating metadata corresponding to each stage of a knowledge cycle. As described in detail above with respect to FIG. 6, a knowledge cycle can be executed having several stages. Additionally, in order to implement the disclosed improved knowledge cycle aspects, metadata corresponds to each particular stage that is performed in a knowledge cycle is also created. The metadata corresponding to one stage provides insight into how "beneficial" that stage is. FIG. 8 depicts a conceptual example of implementing the method 700. In the example of FIG. 8, three iterations of an example knowledge cycle 800 are illustrated.

Generally, the knowledge cycle 800 in FIG. 8 comprises several stages that includes: knowledge creation 801; knowledge storage 802; knowledge networking 803; and knowledge transfer 804. In the first knowledge cycle 810, the knowledge creation stage 811 of the cycle is performed using time-to-collision information and applying a model based (e.g., cluster) method to create the knowledge. Accordingly, the metadata of creation corresponding to stage 811 is shown to include "model based" and "time-to-collision" which is data providing descriptive context on how creation stage 811 for this iteration of the knowledge cycle 810 was performed.

Further, in the first knowledge cycle 810, the knowledge storage stage 812 of the cycle is performed. Particularly, this knowledge storage stage 812 involves placing knowledge on edge/cloud server according to mobility of vehicles approaching the risky zone. Accordingly, the metadata of storage corresponding to stage 812 is shown to include "edge/cloud" and "mobility aware" which is data providing descriptive context on how the knowledge storage stage 812 for this iteration of the knowledge cycle 810 was performed. The first knowledge cycle 810, also includes a knowledge networking stage 813, where V2V communication is used to network the knowledge (e.g., risky zone knowledge) to entities. Accordingly, the metadata of networking corresponding to stage 813 is shown to include "vehicle-to-vehicle" which is data providing descriptive context on how the knowledge networking stage 813 for this iteration of the knowledge cycle 810 was performed. Lastly, the first knowledge cycle 810, preforms a knowledge transfer stage 814, where knowledge relating to a risky zone is transferred to other locations according to geometry features of road sections. The knowledge is composed with another knowledge based on similarity and used parameter is time of day. Accordingly, the metadata of transfer corresponding to stage 814 is shown to include "similarity" and "time of day" which is data providing descriptive context on how the knowledge transfer stage 814 for this iteration of the knowledge cycle 810 was performed. Similarly, as the subsequent iterations of knowledge cycles are performed, namely second knowledge cycle 820 and third knowledge cycle 830 in FIG. 8, metadata corresponding to each these specific stages is created in a similar manner. Thus, metadata corresponding to knowledge cycle 820 incudes: metadata of creation "model based" and "time-to-collision" corresponding to knowledge creation stage 821; metadata of storage "edge/cloud" and "popularity based" corresponding to knowledge storage stage 822; metadata of networking "vehicle-to-cloud" corresponding to knowledge networking stage 823; and metadata of transfer "context based" and "road geometry" corresponding to knowledge transfer stage 824. Metadata corresponding to the third knowledge cycle 830 incudes: metadata of creation "deep learning" corresponding to knowledge creation stage 831; metadata of storage "edge/cloud" and "dynamic caching" corresponding to knowledge storage stage 832; metadata of networking "vehicle-to-vehicle" corresponding to knowledge networking stage 833; and metadata of transfer "similarity" and "time-of-day" corresponding to knowledge transfer stage 834.

Referring back to FIG. 7, operation 702 can involves creating all of this aforementioned metadata depicted in FIG. 8. As illustrated, metadata is created for each of the stages performed in an iteration of the knowledge cycle, respectively. Next, after metadata is created over time (e.g., for one or more iterations of a knowledge cycle), operation 700 continues to operation 704. In operation 704, all of the metadata generated in previous operation 702 is collected and analyzed, in order to determine at least one beneficial path for the knowledge cycle. As described above, analyzing metadata can be an ML process that infers trends in the knowledge cycle to identify which knowledge cycles are beneficial, and further to extract which stages of the beneficial knowledge cycles are key to its high performance.

Once again referring to the example of FIG. 8, analyzing metadata can involve determining which iterations of the knowledge cycle are beneficial. In this example, it is determined that the first knowledge cycle 810 and the third knowledge cycle 830 are beneficial because a high number of vehicles utilize the knowledge associated with this cycle. Conversely, it is determined that the second knowledge cycle 820 is not beneficial, as only a few vehicles are found to use its knowledge. Furthermore, by analyzing the metadata created over the iterations of knowledge cycles, it is inferred that V2V for knowledge networking stage, and similarity-based for knowledge transfer stage are the frequently repeating pattern for the beneficial path 850. With respect to this example, the result of operation 704 would be the determined beneficial path 850 for this knowledge cycle. As depicted in FIG. 8, the beneficial path 850 specifically includes a knowledge networking stage 853 of V2V networking, and a knowledge transfer stage 854 of similarity-based transfer.

In operation 706, a conditional check is performed to detect whether the knowledge cycle has experienced degradation. In an example, operation 706 can involve tracking a quantifiable metric for the knowledge cycle's performance, such as the number of entities that request the knowledge associated with a particular iteration of the knowledge cycle. Then, if it is detected that the performance of knowledge cycles is decreasing over a set time period, or decreases below a set threshold, operation 706 can determine that the knowledge cycle is degrading. A knowledge cycle that is experiencing degradation can be less beneficial in the vehicular knowledge networking functions in a manner that may compromise the overall performance of vehicle system that is reliant on knowledge, such as a driver/vehicle safety system. If operation 706 does detect that the knowledge cycle is degrading (Yes in FIG. 7), then process 700 continues to operation 708 which performs the degradation mitigation aspects of the process 700. Alternatively, if there is no degradation of the knowledge cycle detected in operation 706, the process 700 can return to operation 702. FIG. 7 illustrates that method 700 can be an iterative process, where operations 700-706 can be repeatedly performed in succession, for example corresponding to subsequent iterations of the knowledge cycle.

Figure 9:
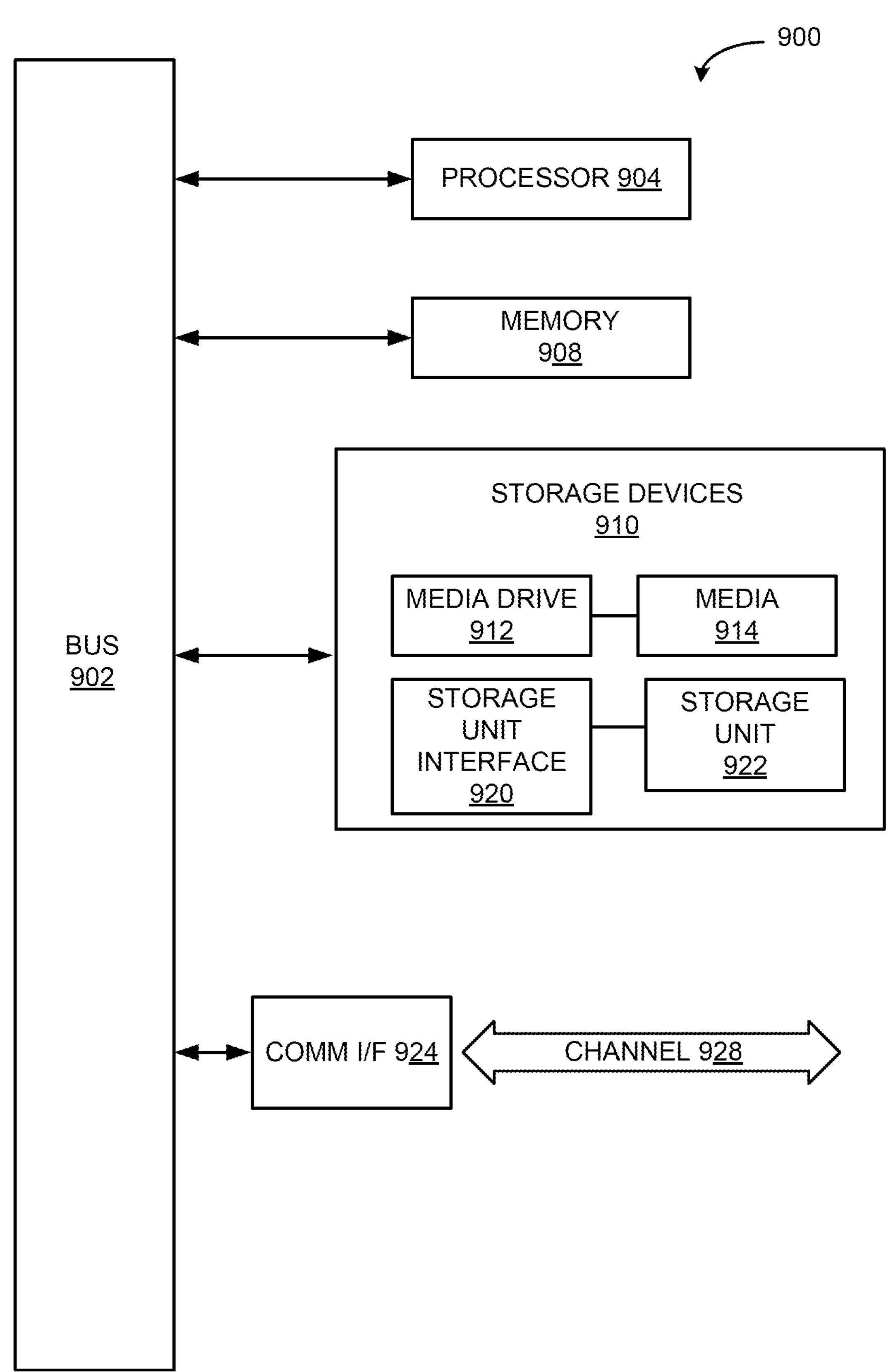
FIG. 9 is an example computing component that may be used to implement various features of embodiments described in the present disclosure.

In operation 708, degradation can be mitigated by dynamically modifying and/or adjusting the knowledge cycle to integrate the beneficial path identified in previous operation 704. For example, operation 708 involves executing only the stages in the beneficial path in any subsequent iterations of the knowledge cycle. With respect to FIG. 8, this can be illustrated as ensuring that any subsequent iterations of the knowledge cycle at least perform the knowledge networking stage 853 of the beneficial path 850, and the knowledge transfer stage 854 of the beneficial path 850 (e.g., knowledge creation stages and knowledge storages can be performed as intended). In other words, by dynamically adjusting knowledge cycles to execute only the deemed "beneficial" stages of V2V knowledge networking and similarity-based and time-of-day knowledge transfer, the knowledge cycle is being optimized. Operation 708 can employ other methods to optimize/adjust a knowledge cycle, ultimately to ensure that the most beneficial mechanisms (e.g., beneficial path) are utilized for performing each cycle, and in turn, improving the performance of the knowledge cycle in a manner that mitigates the degradation the cycle was previously experiencing.

Where components are implemented in whole or in part using software, these software elements can be implemented to operate with a computing or processing component capable of carrying out the functionality described with respect thereto. One such example computing component is shown in FIG. 9. Various embodiments are described in terms of this example computing component 900 After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and the storage unit interface 920. Examples of such storage units 922 and storage unit interfaces 920 can include a program cartridge and cartridge interface, a removable memory (for example, a flash memory or other removable memory component) and memory slot. Other examples may include a PCMCIA slot and card, and other fixed or removable storage units 922 and storage unit interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or soft modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit interface 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle, comprising:

one or more processors configured to execute a knowledge cycle, the knowledge cycle executed to create and distribute knowledge in a vehicular knowledge network, wherein executing the knowledge cycle comprises creating knowledge associated with a geographic area and creating metadata relating to the knowledge cycle, the knowledge cycle comprising a plurality of stages, the plurality of stages comprising a knowledge creation stage and a knowledge networking stage, further wherein:

the knowledge creation stage comprises formation of knowledge using a selected knowledge creation technique, the selected knowledge creation technique being a knowledge creation path for the execution of the knowledge cycle; and the knowledge networking stage comprises distribution of knowledge through the vehicular knowledge network using a selected knowledge networking technique, the selected knowledge networking technique being a knowledge networking path for the execution of the knowledge cycle; and a controller configured to receive knowledge associated with the geographic area and causing the vehicle to perform one or more autonomous safety maneuvers based on the received knowledge when the vehicle is approaching the geographic area;

wherein at least one beneficial path is determined for a new execution of the knowledge cycle by analyzing the metadata relating to the knowledge cycle, wherein the beneficial path comprises a composite of the knowledge creation path and the knowledge networking path that are determined to be beneficial, wherein use of the beneficial path for the new execution improves the knowledge cycle.

2. The vehicle of claim 1, further comprising circuitry communicatively connected to the vehicular knowledge network.

3. The vehicle of claim 2, wherein the vehicular knowledge network comprises one or more entities communicating knowledge within the vehicular knowledge network.

4. The vehicle of claim 3, wherein the one or more entities comprise at least one of:

connected vehicles;

an edge network; and a cloud.

5. The vehicle of claim 4, wherein the controller receives the communicated knowledge from the one or more entities of the vehicular knowledge network.

6. The vehicle of claim 5, wherein the circuitry receives knowledge from connected vehicles via vehicle-to-vehicle (V2V) communication.

7. The vehicle of claim 6, wherein the circuitry receives knowledge from the edge network via vehicle-to-cloud (V2C) communication.

8. The vehicle of claim 1, wherein the received knowledge is associated with risk reasoning of the geographic area.

9. The vehicle of claim 8, wherein performing the one or more autonomous safety maneuvers is based on the risk reasoning of the geographic area.

10. The vehicle of claim 1, wherein the one or more processors dynamically modify the knowledge cycle based on the metadata associated with the knowledge cycle.

11. A system comprising:

at least one memory storing machine-executable instructions; and at least one processor configured to access the at least one memory and execute the machine-executable instructions to:

execute a knowledge cycle associated with knowledge, the knowledge cycle executed to create and distribute knowledge in a vehicular knowledge network, wherein executing the knowledge cycle comprises creating knowledge related to a geographic area and the knowledge cycle comprises a plurality of stages, the plurality of stages comprising a knowledge creation stage and a knowledge networking stage, further wherein:

the knowledge creation stage comprises formation of knowledge using a selected knowledge creation technique, the selected knowledge creation technique being a knowledge creation path for the execution of the knowledge cycle; and the knowledge networking stage comprises distribution of knowledge through the vehicular knowledge network using a selected knowledge networking technique, the selected knowledge networking technique being a knowledge networking path for the execution of the knowledge cycle;

create metadata associated with the knowledge cycle, wherein metadata is created for each of the plurality of stages of the knowledge cycle;

determine at least one beneficial path for a new execution of the knowledge cycle by analyzing the metadata associated with the knowledge cycle, wherein the beneficial path comprises a composite of the knowledge creation path and the knowledge networking path that are determined to be beneficial, wherein use of the beneficial path for the new execution improves the knowledge cycle; and cause a vehicle to perform one or more autonomous safety maneuvers based on the created knowledge when the vehicle is approaching the geographic area.

12. The system of claim 11, wherein the at least one processor configured to access the at least one memory further executes the machine-executable instructions to:

detect whether there is degradation of the knowledge cycle; and upon detecting that there is degradation of the knowledge cycle, perform degradation mitigation of the knowledge cycle.

13. The system of claim 12, wherein the degradation mitigation comprises dynamically modifying the knowledge cycle to integrate the beneficial path into executing the knowledge cycle.

14. The system of claim 13, wherein the at least one processor configured to access the at least one memory further executes the machine-executable instructions to:

identify a beneficial knowledge cycle, and extract one or more beneficial stages from the beneficial knowledge cycle.

15. The system of claim 14, wherein the plurality of stages for the knowledge cycle further comprises one or more of:

a knowledge storage stage; and a knowledge refining stage.

16. The system of claim 15, wherein the metadata corresponding to each of the plurality of stages of the knowledge cycle comprises one or more of:

metadata of creation;

metadata of storage;

metadata of networking; and metadata of refining.

17. The system of claim 11, wherein the one or more autonomous safety maneuvers includes generating a notification for a driver of the vehicle indicating a risk of the geographic area based on the created knowledge.

18. A method comprising:

executing a knowledge cycle associated with knowledge, the knowledge cycle executed to create and distribute knowledge in a vehicular knowledge network, wherein executing the knowledge cycle comprises creating knowledge related to a geographic area and the knowledge cycle comprises a plurality of stages, the plurality of stages comprising a knowledge creation stage and a knowledge networking stage, further wherein:

the knowledge creation stage comprises formation of knowledge using a selected knowledge creation technique, the selected knowledge creation technique being a knowledge creation path for the execution of the knowledge cycle; and the knowledge networking stage comprises distribution of knowledge through the vehicular knowledge network using a selected knowledge networking technique, the selected knowledge networking technique being a knowledge networking path for the execution of the knowledge cycle;

creating metadata associated with the knowledge cycle, wherein metadata is created for each of the plurality of stages of the knowledge cycle;

analyzing the metadata associated with the knowledge cycle;

determining at least one beneficial path for a new execution of the knowledge cycle based on analysis of the metadata associated with the knowledge cycle, wherein the beneficial path comprises a composite of the knowledge creation path and the knowledge networking path that are determined to be beneficial, wherein use of the beneficial path for the new execution improves the knowledge cycle; and causing a vehicle to perform one or more autonomous safety maneuvers based on the created knowledge when the vehicle is approaching the geographic area.

19. The method of claim 18, further comprising:

detecting whether there is degradation of the knowledge cycle; and upon detecting that there is degradation of the knowledge cycle, dynamically modifying the knowledge cycle to integrate the beneficial path into executing the knowledge cycle.

20. The method of claim 19, wherein analyzing the metadata comprises applying machine learning (ML).

* * * * *